(12) United States Patent
Maor et al.

(10) Patent No.: US 11,550,902 B2
(45) Date of Patent: Jan. 10, 2023

(54) USING SECURITY EVENT CORRELATION TO DESCRIBE AN AUTHENTICATION PROCESS

(71) Applicant: Microsoft Technology Licensing, LLC, Redmond, WA (US)

(72) Inventors: Tal Joseph Maor, Tel Aviv (IL); Mor Rubin, Ashdod (IL); Noa Goren, Tel Aviv (IL); Yaron Kaner, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 263 days.

(21) Appl. No.: 16/732,714

(22) Filed: Jan. 2, 2020

(65) Prior Publication Data
US 2021/0209228 A1 Jul. 8, 2021

(51) Int. Cl.
*G06F 21/31* (2013.01)
*G06F 21/55* (2013.01)
*H04L 9/40* (2022.01)

(52) U.S. Cl.
CPC .......... *G06F 21/552* (2013.01); *G06F 21/316* (2013.01); *G06F 2221/034* (2013.01); *H04L 63/1425* (2013.01)

(58) Field of Classification Search
CPC ................. G06F 21/316; G06F 21/552; G06F 2221/034; H04L 63/1425
See application file for complete search history.

(56) References Cited

U.S. PATENT DOCUMENTS

| | | | |
|---|---|---|---|
| 7,219,239 B1* | 5/2007 | Njemanze | H04L 63/0218 726/21 |
| 8,176,527 B1 | 5/2012 | Njemanze et al. | |
| 2013/0081065 A1* | 3/2013 | Sharan | G06F 16/252 719/318 |
| 2013/0081141 A1* | 3/2013 | Anurag | G06F 21/577 726/23 |
| 2016/0306965 A1 | 10/2016 | Iyer et al. | |
| 2017/0171231 A1* | 6/2017 | Reybok, Jr. | H04L 63/14 |
| 2017/0324758 A1 | 11/2017 | Hart et al. | |

(Continued)

OTHER PUBLICATIONS

"Debug Trace", Retrieved From: https://wutils.com/wmi/root/wmi/msv1_0debugtrace/, Retrieved on: Dec. 27, 2019, 2 Pages.

(Continued)

*Primary Examiner* — David J Pearson
(74) *Attorney, Agent, or Firm* — Wade IP Law PLLC

(57) ABSTRACT

Techniques are described herein that are capable of using security event correlation to describe an authentication process. Multiple events may describe a common (i.e., same) attempt to authenticate the user. For instance, a first event may include a first description of the attempt, a second event may include a second description of the attempt, and a third event may include a third description of the attempt. The first, second, and third events may be correlated based at least in part on the first, second, and third descriptions. The first, second, and third events may be aggregated to provide an aggregated event that includes an aggregation of the first, second, and third descriptions. An authentication report may be generated to include the aggregation of the first, second, and third descriptions to describe the authentication process.

20 Claims, 14 Drawing Sheets

(56) References Cited

U.S. PATENT DOCUMENTS

| | | | |
|---|---|---|---|
| 2020/0007536 A1* | 1/2020 | Piel | H04L 63/102 |
| 2021/0029165 A1* | 1/2021 | Fitz-Gerald, Jr. ... | H04L 63/1408 |
| 2021/0367829 A1* | 11/2021 | Zeng | H04L 41/16 |

OTHER PUBLICATIONS

"Windows Security Log Event", Retrieved From: https://www.ultimatewindowssecurity.com/securitylog/encyclopedia/event.aspx?eventID=4776, Jul. 26, 2010, 2 Pages.

Nedpyle, "NTLM Blocking and You: Application Analysis and Auditing Methodologies in Windows 7", Retrieved From: https://blogs.technet.microsoft.com/askds/2009/10/08/ntlm-blocking-and-you-application-analysis-and-auditing-methodologies-in-windows-7/, Oct. 8, 2009, 12 Pages.

"International Search Report & Written Opinion Issued in PCT Application No. PCT/US20/061896", dated Jan. 22, 2021, 12 Pages.

* cited by examiner

USING SECURITY EVENT CORRELATION TO DESCRIBE AN AUTHENTICATION PROCESS

BACKGROUND

Cloud-based security solutions often are used by organizations to identify, detect, and investigate advanced threats, compromised identities, and malicious insider actions directed at the organizations. Examples of a cloud-based security solution include but are not limited to Azure® Active Directory® (AD) and Azure® Advanced Threat Protection™ (ATP), which are developed and distributed by Microsoft Corporation, and Preempt Platform™ and Preempt Lite™, which are developed and distributed by Preempt, Inc. One type of operation that may be performed by a cloud-based security solution is authentication of users. For instance, when a user attempts to access a resource in a cloud-based system, the cloud-based solution may attempt to authenticate the user. For example, the cloud-based system may compare credentials that are received from the user to stored credentials to determine whether the received credentials match the stored credentials. If the received credentials match the stored credentials, the authentication of the user is said to have succeeded. If the received credentials do not match the stored credentials, the authentication of the user is said to have failed. If the authentication succeeded, the user may be given access to the resource, so long as the user is authorized to access the resource. If the authentication failed, the user may not be given access to the resource, even if the user is authorized to do so.

SUMMARY

Various approaches are described herein for, among other things, using security event correlation to describe an authentication process. A security event is an event that describes an attempt to authenticate a user. An event (a.k.a. computer event) may be implemented as an object or other suitable mechanism. Multiple events may describe a common (i.e., same) attempt to authenticate the user. For instance, a first event may include a first description of the attempt, a second event may include a second description of the attempt, and a third event may include a third description of the attempt. The first, second, and third events may be correlated based at least in part on the first, second, and third descriptions. The first, second, and third events may be aggregated to provide an aggregated event that includes an aggregation of the first, second, and third descriptions. An authentication process may include multiple attempts to authenticate any one or more users. Security events may be correlated and aggregated as described above for each attempt to authenticate a user to provide a respective aggregated event. An authentication report may be generated to include the aggregated events to describe the authentication process.

In an example approach to use security event correlation to describe an authentication process, first security event(s) that include respective first description(s) that describe respective attempt(s) to authenticate a user using an authentication protocol and respective second security event(s) that include respective second description(s) that further describe the respective attempt(s) to authenticate the user using the authentication protocol are correlated to identify respective correlated event pair(s) based at least in part on a portion of the first description in the first security event in each correlated event pair and a portion of the second description in the second security event in the respective correlated event pair being same to define a respective common portion. The first security event(s) and the respective second security event(s) are aggregated to provide respective first aggregated event(s) based at least in part on the first security event(s) and the respective second security event(s) being correlated. Each first aggregated event includes a first aggregated description that includes an aggregation of the first and second descriptions that are included in the respective first and second security events that are aggregated to provide the respective first aggregated event. At least one of the first aggregated event(s) and at least one respective third security event that includes at least one respective third description that describes at least one of the attempt(s) to authenticate the user using the authentication protocol are correlated to identify at least one respective associated event pair based at least in part on a portion of the common portion in the first aggregated description in the first aggregated event in each associated event pair and a portion of the third description in the third security event in the respective associated event pair being same. The at least one of the first aggregated event(s) and the at least one respective third security event are aggregated to provide at least one respective second aggregated event based at least in part on the at least one of the first aggregated event(s) and the at least one respective third security event being correlated. Each second aggregated event includes a second aggregated description that includes an aggregation of the first aggregated description and the third description that are included in the first aggregated event and the third security event, respectively, that are aggregated to provide the respective second aggregated event. An authentication report that includes the second aggregated description of each second aggregated event is generated to describe the authentication process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
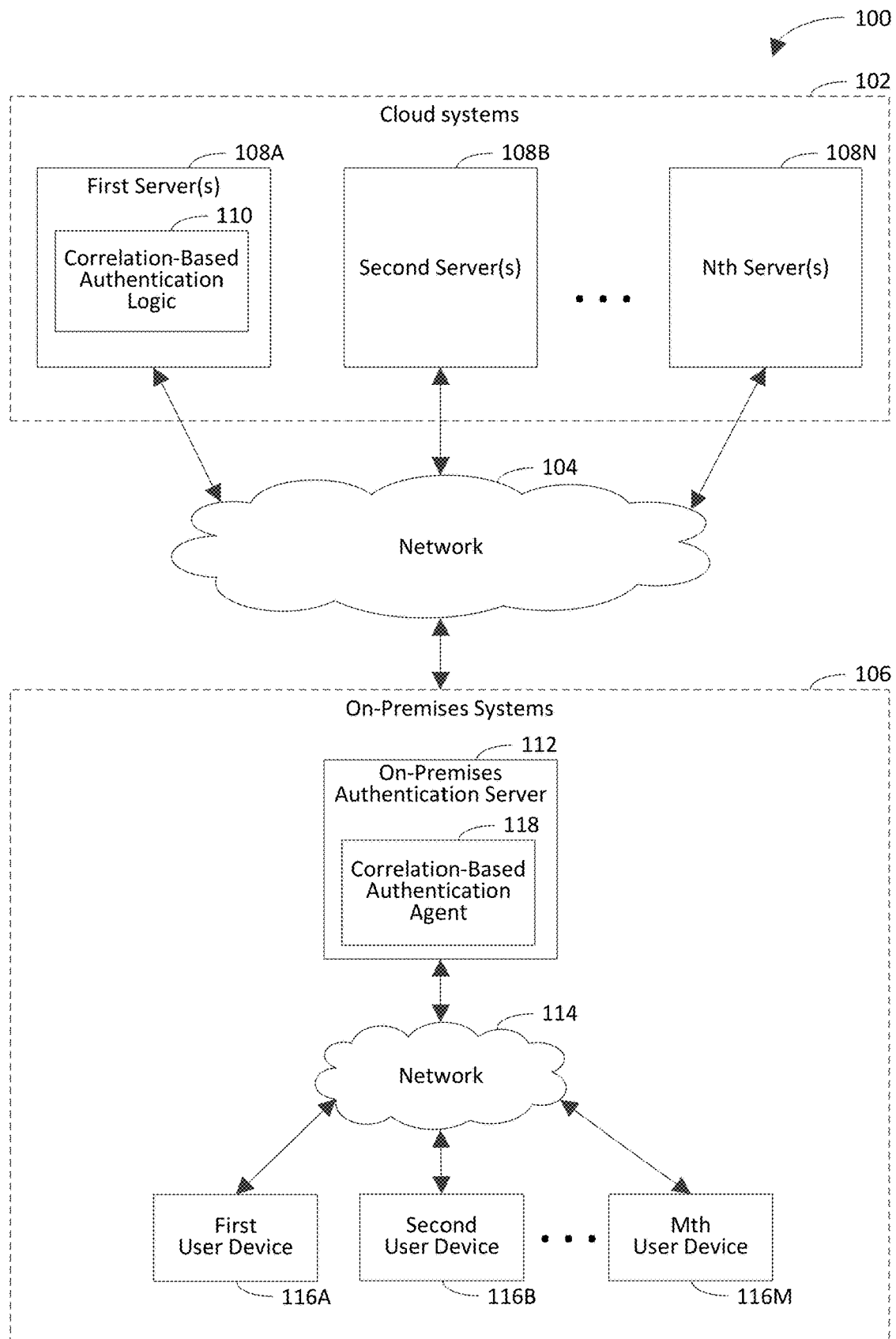
FIG. 1 is a block diagram of an example correlation-based authentication system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of using security event correlation to describe an authentication process. A security event is an event that describes an attempt to authenticate a user. An event (a.k.a. computer event) may be implemented as an object or other suitable mechanism. Multiple events may describe a common (i.e., same) attempt to authenticate the user. For instance, a first event may include a first description of the attempt, a second event may include a second description of the attempt, and a third event may include a third description of the attempt. The first, second, and third events may be correlated based at least in part on the first, second, and third descriptions. The first, second, and third events may be aggregated to provide an aggregated event that includes an aggregation of the first, second, and third descriptions. Accordingly, if a single event or network packet does not provide an adequately thorough description of an attempt to authenticate a user, the aggregated event may provide the adequately thorough description (e.g., a computer from which the user attempts to authenticate, a resource that the user attempts to access in association with the attempt to authenticate, etc.). An authentication process may include multiple attempts to authenticate any one or more users. Security events may be correlated and aggregated as described above for each attempt to authenticate a user to provide a respective aggregated event. An authentication report that includes the aggregated events may be generated to describe the authentication process.

Example techniques described herein have a variety of benefits as compared to conventional techniques for describing an authentication process. For instance, the example techniques may be capable of providing a more thorough description of the authentication process than the convention techniques. The description of each attempt to authenticate a user in the authentication process may indicate any of a variety of information, including but not limited to the user to whom the attempt pertains, a computer from which an authentication request corresponding to the attempt is received, an authentication server (e.g., a domain server) that generates the security events that describe the attempt, a time at which the attempt occurred, whether the attempt resulted in authentication of the user, a resource that the user attempts to access based at least in part on the attempt, and/or a version of an authentication protocol that is used in the attempt.

By using security event correlation to describe an authentication process, the example techniques may reduce an amount of time and/or resources (e.g., memory, processor cycles, network bandwidth) that is consumed to determine information to describe the authentication process. In one example implementation, the example techniques may improve performance of a computing system by automating a variety of operations associated with determining the aforementioned information that are traditionally performed manually (e.g., by an information technology (IT) administrator). For example, in accordance with this implementation, the performance of the computing system may be improved by automating correlation and/or aggregation of events that describe the same attempt to authenticate a user. In accordance with this implementation, by providing such automation, the example techniques may reduce a number of times that memory of the computing system is accessed (e.g., by an IT administrator), an amount of memory that is consumed, and/or a number of processor cycles consumed to correlate and/or aggregate events that describe the same attempt to authenticate a user. The example techniques may increase efficiency of a computing system that is used to determine information to describe an authentication process. The example techniques may increase user efficiency (e.g., efficiency of an IT administrator). For example, by automating correlation and/or aggregation of events that describe the same attempt to authenticate a user, the example techniques may reduce a number of steps that are performed by an IT administrator, an amount of effort that the IT administrator expends, and/or an amount of time that the IT administrator takes to determine the information to describe the authentication process.

FIG. 1 is a block diagram of an example correlation-based authentication system 100 in accordance with an embodiment. Generally speaking, the correlation-based authentication system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, the correlation-based authentication system 100 uses security event correlation to describe an authentication process. Detail regarding techniques for using security event correlation to describe an authentication process is provided in the following discussion.

As shown in FIG. 1, the correlation-based authentication system 100 includes cloud systems 102, a network 104, and on-premises systems 106. Communication among the cloud systems 102 and the on-premises systems 106 is carried out at least in part over the network 104 using well-known network communication protocols. The network 104 may be a wide-area network (e.g., the Internet), a local area network (LAN), another type of network, or a combination thereof.

The on-premises systems 106 include an on-premises authentication server 112, a network 114, a plurality of user devices 116A-116M, and an admin system 120. Communication among the on-premises authentication server 112, the user devices 116A-116M, and the admin system 120 is carried out over the network 114 using well-known network communication protocols. The network 114 may be a wide-area network (e.g., the Internet), a local area network (LAN), another type of network, or a combination thereof.

The user devices 116A-116M are processing systems that are capable of communicating with servers 108A-108N, which are included in the cloud systems 102 described below. An example of a processing system is a system that includes at least one processor that is capable of manipulating data in accordance with a set of instructions. For instance, a processing system may be a computer, a personal digital assistant, etc. The user devices 116A-116M are configured to provide requests to the servers 108A-108N for requesting information stored on (or otherwise accessible via) the servers 108A-108N. For instance, a user may initiate a request for executing a computer program (e.g., an application) using a client (e.g., a Web browser, Web crawler, or other type of client) deployed on a user device 116 that is owned by or otherwise accessible to the user. In accordance with some example embodiments, the user devices 116A-116M are capable of accessing domains (e.g., Web sites) hosted by the servers 108A-108N, so that the user devices 116A-116M may access information that is available via the domains. Such domains may include Web pages, which may be provided as hypertext markup language (HTML) documents and objects (e.g., files) that are linked therein, for example. The requests that are provided by the user devices 116A-116M may include authentication requests. An authentication request is a request to authenticate a user. For instance, access to requested information may require that the user be authenticated. An authentication request may include credentials of a user so that the credentials may be compared with stored credentials for purposes of authentication. Each authentication request regarding a user initiates a respective attempt to authenticate the user.

Each of the user devices 116A-116M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 116A-116M may communicate with any one or more of the servers 108A-108N.

The on-premises authentication server 112 is a processing system that is capable of communicating with the user devices 116A-116M. The on-premises authentication server 112 may be implemented as a domain controller, though the example embodiments are not limited in this respect. For instance, the domain controller may store credentials of each user in a domain with which the domain controller is associated and determine whether authentication is successful each time a user provides a request for authentication (e.g., when attempting to access a resource in the domain). The on-premises authentication server 112 is configured to generate security events in response to (e.g., based at least in part on) attempts to authenticate users of the correlation-based authentication system 100. For instance, the on-premises authentication server 112 may generate one or more security events in response to each authentication request that is received from each of the user devices 116A-116M. Each security event that is generated by the on-premises authentication server 112 includes a description of an attempt to authenticate a user on which the security event is based.

The on-premises authentication server 112 is shown to host (e.g., execute) a correlation-based authentication agent 118 for illustrative purposes. The correlation-based authentication agent 118 is configured to perform client-side aspects of the example techniques described herein. For instance, the correlation-based authentication agent 118 may correlate two or more of the events that are generated by the on-premises authentication server 112 for each attempt to authenticate a user based at least in part on the descriptions that are included in those events. The correlation-based authentication agent 118 may aggregate the correlated events for each attempt to authenticate a user to provide a respective aggregated event for that attempt. Each aggregated event includes an aggregation of the descriptions of the events that were aggregated to provide the respective aggregated event to provide a respective aggregated description of the respective attempt. The correlation-based authentication agent 118 may forward the aggregated events and any detected security events that are not yet correlated with another security event (i.e., detected uncorrelated events) to correlation-based authentication logic 110, which is discussed in detail below, for processing. An information technology (IT) administrator may download the correlation-based authentication agent 118 onto the on-premises authentication server 112 from the first server(s) 108A, though the scope of the example embodiments is not limited in this respect.

The on-premises authentication server 112 need not necessarily be on-premises (e.g., within an organization's enterprise). For instance, the on-premises authentication server 112 may be a cloud-based server that is included among the cloud systems 102 (e.g., external to the organization's enterprise). It will be recognized that if the on-premises authentication server 112 is located in the cloud, the aspects of the example techniques performed by the correlation-based authentication agent 118 will be server-side aspects of the example techniques, rather than client-side aspects of the example techniques.

The cloud systems 102 include a plurality of servers 108A-108N. The servers 108A-108N are processing systems that are capable of communicating with the on-premises systems 106. The servers 108A-108N are configured to execute computer programs that provide information to the user devices 116A-116M. For instance, the servers 108A-108N may push such information to the user devices 116A-116M or provide the information in response to requests that are received from the user devices 116A-116M. The requests may be user-generated or generated without user involvement. For example, policies that are applied to a user device are done without explicit user requests. In accordance with this example, the policies are applied in the background even if no user is logged onto the user device. In further accordance with this example, the user device (e.g., an agent thereon) may poll a server for policy on a schedule (e.g., once per hour) or on events (e.g., device wakeup, user unlock, etc.). In further accordance with this example, the server may push the policy to the user device (e.g., an agent thereon) via an open HTTP endpoint. The information provided by the servers 108A-108N may include documents (e.g., Web pages, images, audio files, video files, etc.), output of executables, or any other suitable type of information. In accordance with some example embodiments, the servers 108A-108N are configured to host respective Web sites, so that the Web sites are accessible to users of the correlation-based authentication system 100.

The first server(s) 108A are shown to include the correlation-based authentication logic 110 for illustrative purposes. The correlation-based authentication logic 110 is configured to perform server-side aspects of the example techniques described herein. For instance, the correlation-based authentication logic 110 may correlate the aggregated event and any detected uncorrelated events for each attempt to authenticate a user based at least in part on the descriptions that are included in those events. For example, the correlation-based authentication logic 110 may correlate a first aggregated event and first detected uncorrelated event(s) for a first attempt to authenticate a user based at least in part on the aggregated description in the first aggregated event and the description(s) that are included in the first detected uncorrelated event(s). The correlation-based authentication logic 110 may correlate a second aggregated event and second detected uncorrelated event(s) for a second attempt to authenticate a user based at least in part on the aggregated description in the second aggregated event and the description(s) that are included in the second detected uncorrelated event(s), and so on.

The correlation-based authentication logic 110 may aggregate the aggregated events and the detected uncorrelated events for each attempt to authenticate a user to provide a respective further aggregated event for that attempt. For instance, the correlation-based authentication logic 110 may aggregate the first aggregated events and the first detected uncorrelated event(s) for the first attempt to authenticate a user to provide a first further aggregated event. The correlation-based authentication logic 110 may aggregate the second aggregated events and the second detected uncorrelated event(s) for the second attempt to authenticate a user to provide a second further aggregated event, and so on. Each further aggregated event includes an aggregation of the descriptions of the events that were aggregated to provide the respective further aggregated event to provide a respective further aggregated description of the respective attempt. For instance, a first further aggregated event may include an aggregation of the aggregated description in the first aggregated event and the description(s) that are included in the first detected uncorrelated event(s). A second further aggregated event may include an aggregation of the aggregated description in the second aggregated event and the description(s) that are included in the second detected uncorrelated event(s), and so on.

It will be recognized that the correlation-based authentication logic 110 need not necessarily correlate each aggregated event that is received from the correlation-based authentication agent 118 with one or more detected uncorrelated events. For instance, it is possible that none of the detected uncorrelated events describe an attempt to authenticate a user that is described by an aggregated event.

The correlation-based authentication logic 110 may generate an authentication report that includes the further aggregated description of each further aggregated event to describe the authentication process. The authentication report may further include the aggregated description of each aggregated event that was not correlated with at least one detected uncorrelated event by the correlation-based authentication logic 110 to further describe the authentication process, though the scope of the example embodiments is not limited in this respect. For instance, the correlation-based authentication logic 110 may present the authentication report to an IT administrator for review.

Each of the correlation-based authentication logic 110 and the correlation-based authentication agent 118 may be implemented in various ways to use security event correlation to describe an authentication process, including being implemented in hardware, software, firmware, or any combination thereof. For example, each of the correlation-based authentication logic 110 and the correlation-based authentication agent 118 may be implemented as computer program code configured to be executed in one or more processors. In another example, each of the correlation-based authentication logic 110 and the correlation-based authentication agent 118 may be at least partially implemented as hardware logic/electrical circuitry. For instance, each of the correlation-based authentication logic 110 and the correlation-based authentication agent 118 may be at least partially implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

The correlation-based authentication logic 110 is shown to be incorporated in first server(s) 108A for illustrative purposes and is not intended to be limiting. It will be recognized that the correlation-based authentication logic 110 may be incorporated in any one or more of the servers 108A-108N. Any of the operations described above as being performed by the correlation-based authentication logic 110 may be performed in collaboration with the correlation-based authentication agent 118 or may be performed instead by the correlation-based authentication agent 118. Any of the operations described above as being performed by the correlation-based authentication agent 118 may be performed in collaboration with the correlation-based authentication logic 110 or may be performed instead by the correlation-based authentication logic 110.

Figure 2:
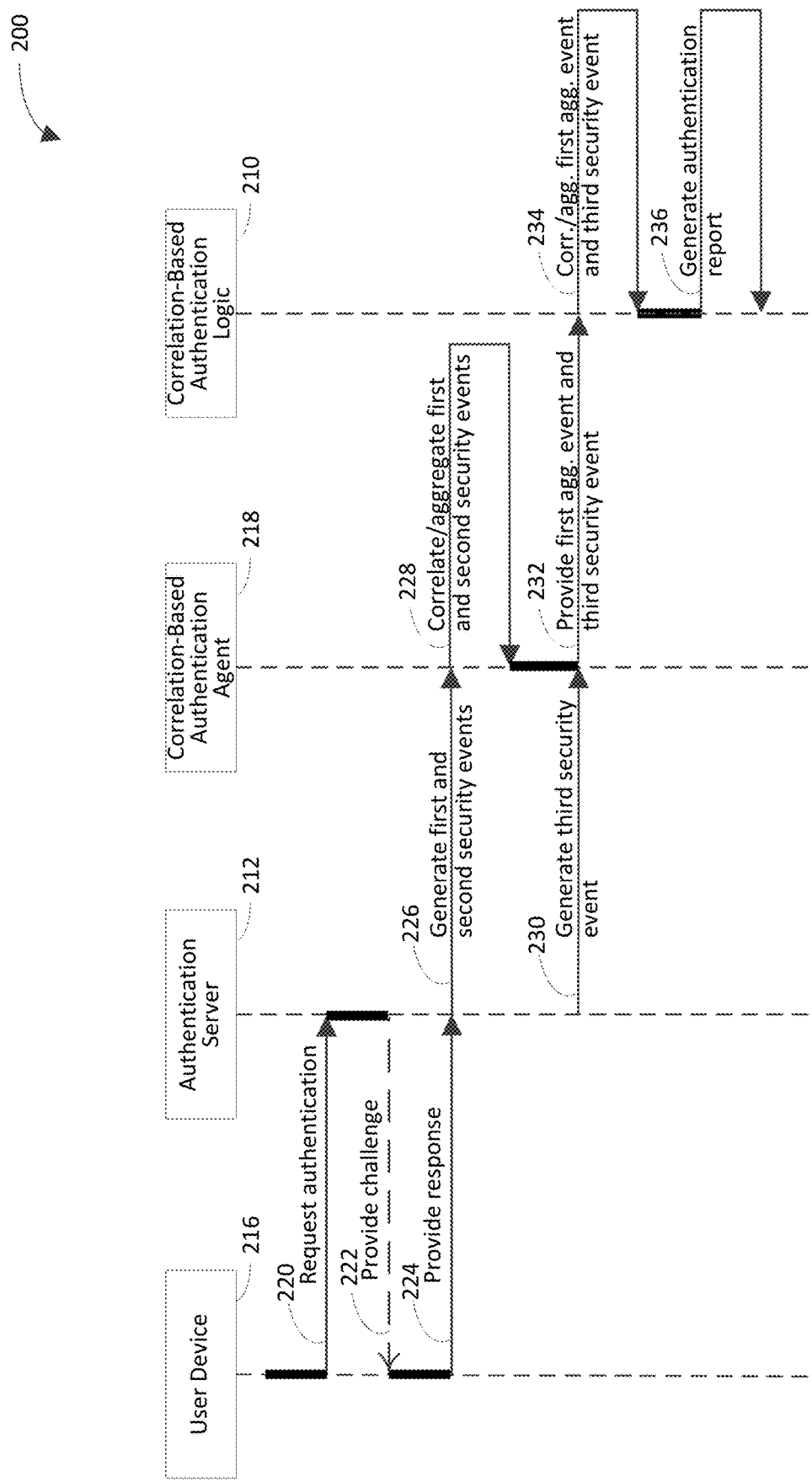
FIG. 2 is an example activity diagram in accordance with an embodiment.

FIG. 2 is an example activity diagram 200 in accordance with an embodiment. FIG. 2 depicts a user device 216, an authentication server 212, a correlation-based authentication agent 218, and correlation-based authentication logic 210. Activities 220, 222, 224, 226, 228, 230, 232, 234, and 236 will now be described with reference to the user device 216, the authentication server 212, the correlation-based authentication agent 218, and the correlation-based authentication logic 210.

In activity 220, the user device 216 generates a request to authenticate a user. For example, the user device 216 may be owned or controlled by the user. The request initiates an attempt to authenticate the user. The request may indicate capabilities of the user device 216. The user device 216 may generate the request based on instructions that are received from the user. The instructions from the user may indicate that the user wishes to access a resource. The resource may include data and/or code. For instance, the resource may be a document (e.g., Web page, image, audio file, video file, etc.), a software application (e.g., Web application), a database, a storage location (e.g., trusted execution environment (TEE)), etc. The resource may be a cloud-based resource.

In activity 222, the authentication server 212 provides a challenge to the user device 216 (e.g., to establish the identity of the user device 216). The challenge is an inquiry that solicits a valid response. A valid response is a response that is expected by the authentication server 212.

In activity 224, the user device 216 provides a response, which is based on the challenge, to the authentication server 212. If the response provided by the user device 216 matches (e.g., is equal to or is semantically same as) the response that is expected by the authentication server 212, the user is deemed to be authenticated. If the response provided by the user device 216 does not match the response that is expected by the authentication server 212, the user is deemed to be not authenticated.

In activity 226, the authentication server 212 generates first and second security events. The first security event includes a first description of the attempt to authenticate the user. The second security event includes a second description of the attempt to authenticate the user. The first and second descriptions are not the same, though the first and second descriptions may overlap. Accordingly, the first and second descriptions may include some common information.

In an example description embodiment, the first security event includes a first user identifier that indicates the user for whom authentication is requested, a first computer identifier that identifies the user device 216 from which the authentication request is received, a first server identifier that identifies the authentication server 212 that generates the first security event, a first timestamp indicating a time at which the request to authenticate the user is received at the authentication server 212, and a status indicator that indicates whether the attempt to authenticate the user resulted in authentication of the user. In accordance with this example embodiment, the second security event includes a second user identifier that indicates the user for whom authentication is requested, a second computer identifier that identifies the user device 216 from which the authentication request is received, a second server identifier that identifies the authentication server 212 that generates the second security event, a second timestamp indicating a time at which the request to authenticate the user is received at the authentication server 212, and a resource indicator that indicates a resource that the user attempts to access by providing the authentication request. The identifiers described herein may be respective values in respective key-value pairs.

In activity 228, the correlation-based authentication agent 218, which runs on the authentication server 212, correlates and aggregates the first and second security events. For instance, the correlation-based authentication agent 218 may compare a portion of the first description and a portion of the second description to determine whether the portion of the first description matches (e.g., is equal to or is semantically same as) the second description. In an example, the first description includes first key-value pairs corresponding to respective identifiers in the first description. In accordance with this example, the second description includes second key-value pairs corresponding to respective identifiers in the second description. In further accordance with this example, the portion of the first description includes a first subset of the first key-value pairs, and the portion of the second description includes a second subset of the second key-value pairs. In further accordance with this example, the correlation-based authentication agent 218 may compare the first subset and the second subset to determine whether the first subset and the second subset match. If the portions of the respective first and second descriptions (e.g., the respective first and second subsets therein) match, the correlation-based authentication agent 218 aggregates the first and second security events, resulting in a first aggregated event. The first aggregated event includes an aggregated description, which is an aggregation of the first and second descriptions. If the portions of the respective first and second descriptions do not match, the correlation-based authentication agent 218 does not aggregate the first and second security events. For purposes of this example, it is assumed that the portions of the respective first and second descriptions match. A proportion of the first and second security events that are correlated in activity 228 may be greater than or equal to a threshold proportion. For instance, the threshold proportion may be 90%, 93%, 95%, or 97%.

In the example description embodiment mentioned above, the correlation-based authentication agent 218 compares the first user identifier, the first computer identifier, the first sever identifier, and the first timestamp with the second user identifier, the second computer identifier, the second sever identifier, and the second timestamp, respectively. If the first and second user identifiers match, the first and second computer identifiers match, the first and second server identifiers match, and the first and second timestamps match, the correlation-based authentication agent 218 aggregates the first and second security events, resulting in the first aggregated event. Otherwise, the correlation-based authentication agent 218 does not aggregate the first and second security events. The first aggregated event includes an aggregated description. The aggregated description includes a common user identifier, a common computer identifier, a common server identifier, the status indicator from the first event, and the resource indicator from the second event. The common user identifier is the same as the first user identifier and the second user identifier. The common computer identifier is the same as the first computer identifier and the second computer identifier. The common server identifier is the same as the first server identifier and the second server identifier.

In activity 230, the authentication server 212 generates a third security event. The third security event includes a third description of the attempt to authenticate the user. The third description is not the same as the first description and is not the same as the second description. However, the first and third descriptions may overlap. Accordingly, the first and third descriptions may include some common information. The second and third descriptions may overlap. Accordingly, the second and third descriptions may include some common information.

In the example description embodiment mentioned above, the third security event includes a third user identifier that indicates the user for whom authentication is requested, a third computer identifier that identifies the user device 216 from which the authentication request is received, a third server identifier that identifies the authentication server 212 that generates the third security event, and a version indicator that indicates a version of the authentication protocol that is used in the attempt to authenticate the user. For instance, the response that is provided by the user device 216 in activity 224 has a length. The length of the response indicates the version of the authentication protocol that is used in the attempt to authenticate the user. For example, the length being equal to a threshold length corresponds to a first version of the authentication protocol. The length being greater than the threshold length corresponds to a second version of the authentication protocol.

In activity 232, the correlation-based authentication agent 218 provides the first aggregated event and the third security event to the correlation-based authentication logic 210 for processing.

In activity 234, the correlation-based authentication logic 210 correlates and aggregates the first aggregated event and the third security event. For instance, the correlation-based authentication logic 210 may compare a portion of the aggregated description in the first aggregated event and a portion of the third description in the third security event to determine whether the portion of the aggregated description matches (e.g., is equal to or is semantically same as) the portion of the third description. In an example, the aggregated description includes aggregated key-value pairs corresponding to respective identifiers in the aggregated description. In accordance with this example, the third description includes third key-value pairs corresponding to respective identifiers in the third description. In further accordance with this example, the portion of the aggregated description includes a subset of the aggregated key-value pairs, and the portion of the third description includes a third subset of the third key-value pairs. In further accordance with this example, the correlation-based authentication agent 218 may compare the subset of the aggregated key-value pairs and the third subset to determine whether the subset of the aggregated key-value pairs and the third subset match. If the portion of the aggregated description and the portion of the third description (e.g., the respective subset of the aggregated key-value pairs and third subset therein) match, the correlation-based authentication logic 210 aggregates the first aggregated event and the third security event, resulting in a second aggregated event. The second aggregated event includes an aggregation of the aggregated description and the third description. If the portion of the aggregated description and the portion of the third description do not match, the correlation-based authentication logic 210 does not aggregate the first aggregated event and the third security event.

In the example description embodiment mentioned above, the correlation-based authentication logic 210 compares the common user identifier, the common computer identifier, and the common sever identifier with the third user identifier, the third computer identifier, and the third sever identifier, respectively. If the common and third user identifiers match, the common and third computer identifiers match, and the common and third server identifiers match, the correlation-based authentication logic 210 aggregates the first aggregated event and the third security event, resulting in the second aggregated event. Otherwise, the correlation-based authentication logic 210 does not aggregate the first aggregated event and the third security event.

In activity 236, the correlation-based authentication logic 210 generates an authentication report. The authentication report includes the aggregation of the aggregated description and the third description from the second aggregated event based at least in part on the first aggregated event and the third security event being correlated and aggregated in activity 234. It should be noted that if the first aggregated event and the third security event had not been correlated and aggregated in activity 234, the authentication report would include the aggregated description from the first aggregated event in lieu of the aggregation of the aggregated description and the third description from the second aggregated event.

Activities 220, 222, 224, 226, 228, 230, 232, and 234 may be repeated for each attempt to authenticate a user, regardless whether the request that initiates the attempt is provided by the user device 216 or another user device. For instance, requests to authenticate users may be provided by any of a variety of user devices. The correlation-based authentication logic 210 may generate the authentication report to include descriptions of the respective attempts to authenticate the users. Each of the descriptions may be determined by performing the activities described herein. The various attempts to authenticate user(s) may be referred to as an authentication process. Accordingly, the correlation-based authentication logic 210 may generate the authentication report to describe the authentication process.

In an example NTLM embodiment, the authentication protocol is a new technology LAN manager (NTLM) authentication protocol. In accordance with the NTLM authentication protocol, the challenge that is provided by the authentication server 212 to the user device 216 in activity 222 includes an 8-byte random number.

In a first version of the NTLM authentication protocol, NTLMv1, the user device 216 performs an operation involving the challenge and a secret shared by the client device 216 and the authentication server 212. The secret may include an LM hash and/or an NT hash. The LM hash is a data encryption standard-based (DES-based) function applied to the first fourteen characters of the user's password, which is converted to the traditional eight-bit personal computer (PC) character set for the given language. The NT hash is an MD4 message-digest algorithm hash of the little endian 16-bit Unicode Transformation Format (UTF-16 Unicode) password. Each of the LM hash and the NT hash is 16 bytes. The response that is provided by the user device 216 to the authentication server 212 in activity 224 includes a 24-byte result of the operation. If the operation is performed using both hashes, the response includes a 24-byte result for each hash. If the authentication server 212 determines that the response provided by the user device 216 matches the expected response, the authentication server 212 infers that the client device 216 possesses the secret, resulting in authentication of the user. If the authentication server 212 determines that the response provided by the user device 216 does not match the expected response, the authentication server 212 infers that the client device 216 does not possess the secret, resulting in the user not being authenticated.

In a second version of the NTLM authentication protocol, NTLMv2, the response that is provided by the user device 216 to the authentication server 212 in activity 224 includes a first part and a second part. Each of the first and second parts of the response includes a 16-byte HMAC-MD5 hash of the challenge that is provided by the authentication server 212 to the user device 216 in activity 222, a randomly or semi-randomly generated client challenge, and an HMAC-MD5 hash of the user's password. A HMAC-MD5 hash is a type of keyed hash algorithm that is constructed from a message digest algorithm 5 (MD5) hash function and used as a hash-based message authentication code (HMAC). The client challenges in the respective first and second parts of the response are different. The client challenge in the first part of the response is an 8-byte random value, which causes the first part of the response to have a length of 24-bytes. The client challenge in the second part of the response has a variable length. The client challenge in the second part includes a representation of the time at which the response is generated, an 8-byte random value, and a domain name.

In accordance with the NTLM embodiment, the first and second events may be Windows® security log events. For instance, the first event may be a 4776 event associated with the NTLM authentication protocol. The second event may be an 8004 event associated with the NTLM authentication protocol. Logs associated with the 4776 event and the 8004 event may not be audited by default. For instance, an IT administrator may set a group policy to audit the logs associated with the 4776 event and the 8004 event. The third event may be an Event Tracing for Windows (ETW) event. An ETW event is an event that is logged using ETW. ETW is a kernel-level tracing mechanism that enables logging of kernel events and application-defined events in a log file. The authentication server 212 may execute the ETW to log such events. The kernel events may be raised by kernel-mode drivers, and the application-defined events may be raised by user-mode applications. ETW may be implemented in the Windows® operating system. Accordingly, the authentication server 212 may execute the Windows® operating system in which ETW is implemented, the kernel-mode drivers to raise the kernel events, and the user-mode applications to raise the application-defined events.

In accordance with the NTLM embodiment, each first aggregated event that is associated with the first version of the NTLM authentication protocol, NTLMv1, may be stored (at least temporarily) in a cache. For instance, these first aggregated events may be stored in the cache for multiple minutes (e.g., 2, 3, 4, 5, or 6 minutes). In this time frame, the first aggregated descriptions in the respective first aggregated events may be compared to third descriptions in respective third security events to determine which of the first aggregated events is correlated with which of the third security events, if any. For each successful correlation between a first aggregated event and a respective third security event, the respective first aggregated event and the respective third security event may be aggregated to provide a second aggregated event, and a counter that is initialized to "0" may be increased by "1". At the end of the time frame, if the counter is greater than 0 for a second aggregated event, the cache may fire the second aggregated event, mentioning how many of the first security events from which the respective first aggregated events are aggregated are associated with the first version of the NTLM authentication protocol, NTLMv1. Otherwise, no version of the NTLM authentication protocol is determined for the respective first security event, and the first security event and the correlated second security event may be fired without mentioning the NTLM version with which the first security event is associated.

In some example embodiments, one or more of the activities 220, 222, 224, 226, 228, 230, 232, 234, and/or 236 of the activity diagram 200 may not be performed. Moreover, activities in addition to or in lieu of the activities 220, 222, 224, 226, 228, 230, 232, 234, and/or 236 may be performed.

Figures 3, 4:
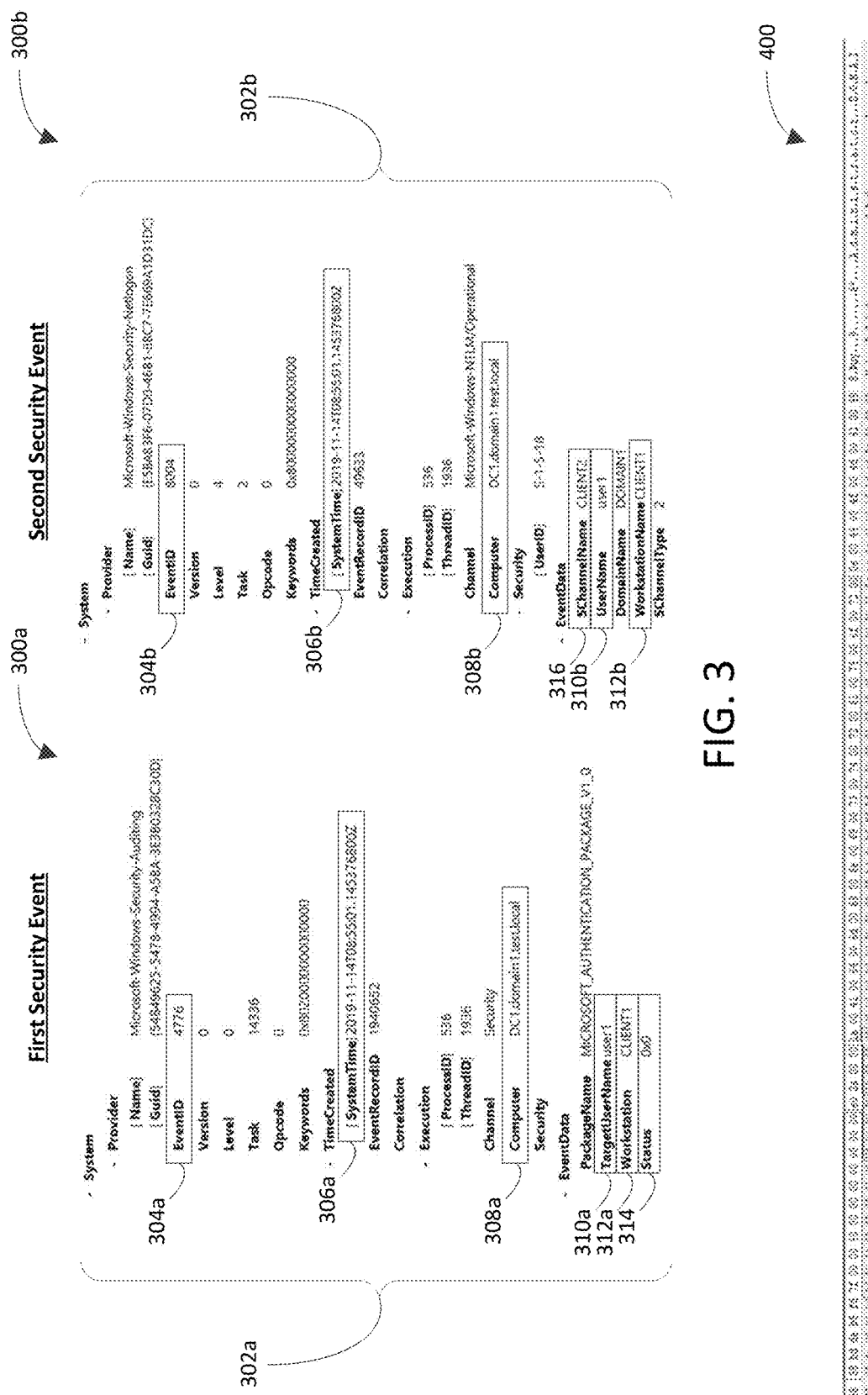
FIG. 3 illustrates example first and second security events in accordance with an embodiment.
FIG. 4 illustrates an example Event Tracing for Windows (ETW) trace in accordance with an embodiment.

FIG. 3 illustrates example first and second security events 300a and 300b in accordance with an embodiment. As shown in FIG. 3, the first security event 300a includes a first description 302a. The first description 302a includes a first plurality of identifiers. The first plurality of identifiers includes, in part, a first event identifier 304a, a first timestamp 306a, a first server identifier 308a, a first user identifier 310a, a first computer identifier 312a, and a status indicator 314. The first event identifier 304a indicates an event type of the first security event 300a. The event type is indicated to be a 4776 event, which is associated with the NTLM authentication protocol. The first timestamp 306a indicates a time at which an attempt to authenticate the user that is associated with the first event 300a occurred. The first timestamp 306a indicates that the attempt to authenticate the user occurred at 8:55:01 on Nov. 14, 2019 (i.e., 2019-11-14). The first server identifier 308a identifies an authentication server that generates the first security event 300a. The authentication server is labeled "DC1.domain1.test.local." The first user identifier 310a indicates the user to whom the attempt to authenticate pertains. The first user identifier 310a indicates that the attempt to authenticate pertains to user1. The first computer identifier 312a identifies a computer from which an authentication request corresponding to the attempt to authenticate the user is received. The first computer identifier 312a indicates that the authentication request was received from CLIENT1. The status indicator 314 indicates whether the respective attempt to authenticate the user resulted in authentication of the user. The status indicator 314 indicates a status of "0x0," meaning that the attempt to authenticate the user succeeded (i.e., the attempt resulted in authentication of the user).

The second security event 300b includes a second description 302b. The second description 302b includes a second plurality of identifiers. The second plurality of identifiers includes, in part, a second event identifier 304b, a second timestamp 306b, a second server identifier 308b, a second user identifier 310b, a second computer identifier 312b, and a resource indicator 316. The second event identifier 304b indicates an event type of the second security event 300b. The event type is indicated to be an 8004 event, which is associated with the NTLM authentication protocol. The second timestamp 306b indicates a time at which an attempt to authenticate the user that is associated with the second event 300b occurred. The second timestamp 306b indicates that the attempt to authenticate the user occurred at 8:55:01 on Nov. 14, 2019 (i.e., 2019-11-14). The second server identifier 308b identifies an authentication server that generates the second security event 300b. The authentication server is labeled "DC1.domain1.test.local." The second user identifier 310b indicates the user to whom the attempt to authenticate pertains. The second user identifier 310b indicates that the attempt to authenticate pertains to user1. The second computer identifier 312b identifies a computer from which an authentication request corresponding to the attempt to authenticate the user is received. The second computer identifier 312b indicates that the authentication request was received from CLIENT1. The resource indicator 316 indicates a resource that the user attempts to access based at least in part on the attempt to authenticate. The resource indicator 316 indicates that the user attempts to access CLIENT2.

The first timestamp 306a, the first server identifier 308a, the first user identifier 310a, and the first computer identifier 312a may be compared to the second timestamp 306b, the second server identifier 308b, the second user identifier 310b, and the second computer identifier 312b, respectively, in accordance with one or more of the example techniques described herein to determine whether the first security event 300a and the second security event 300b are correlated.

FIG. 4 illustrates an example Event Tracing for Windows (ETW) trace 400 in accordance with an embodiment. The ETW trace 400 includes a plurality of hexadecimal values from which identifiers in a corresponding ETW event may be derived. For instance, the ETW trace 400 may be analyzed to derive a third user identifier, a third computer identifier, a third server identifier, and a version indicator, which are included in the ETW event. The third user identifier indicates a user to whom the attempt to authenticate that is described by the ETW event pertains. The third computer identifier identifies a computer from which an authentication request corresponding to the attempt to authenticate the user is received. The third server identifier identifies an authentication server that generates the ETW event. The version indicator indicates a version of the authentication protocol that is used in the attempt to authenticate the user. The version indicator is based at least in part on a length of an authentication response that is received from the user by the authentication server with regard to the attempt to authenticate the user. The length of the authentication response may be derived from the ETW trace 400.

Figure 5:
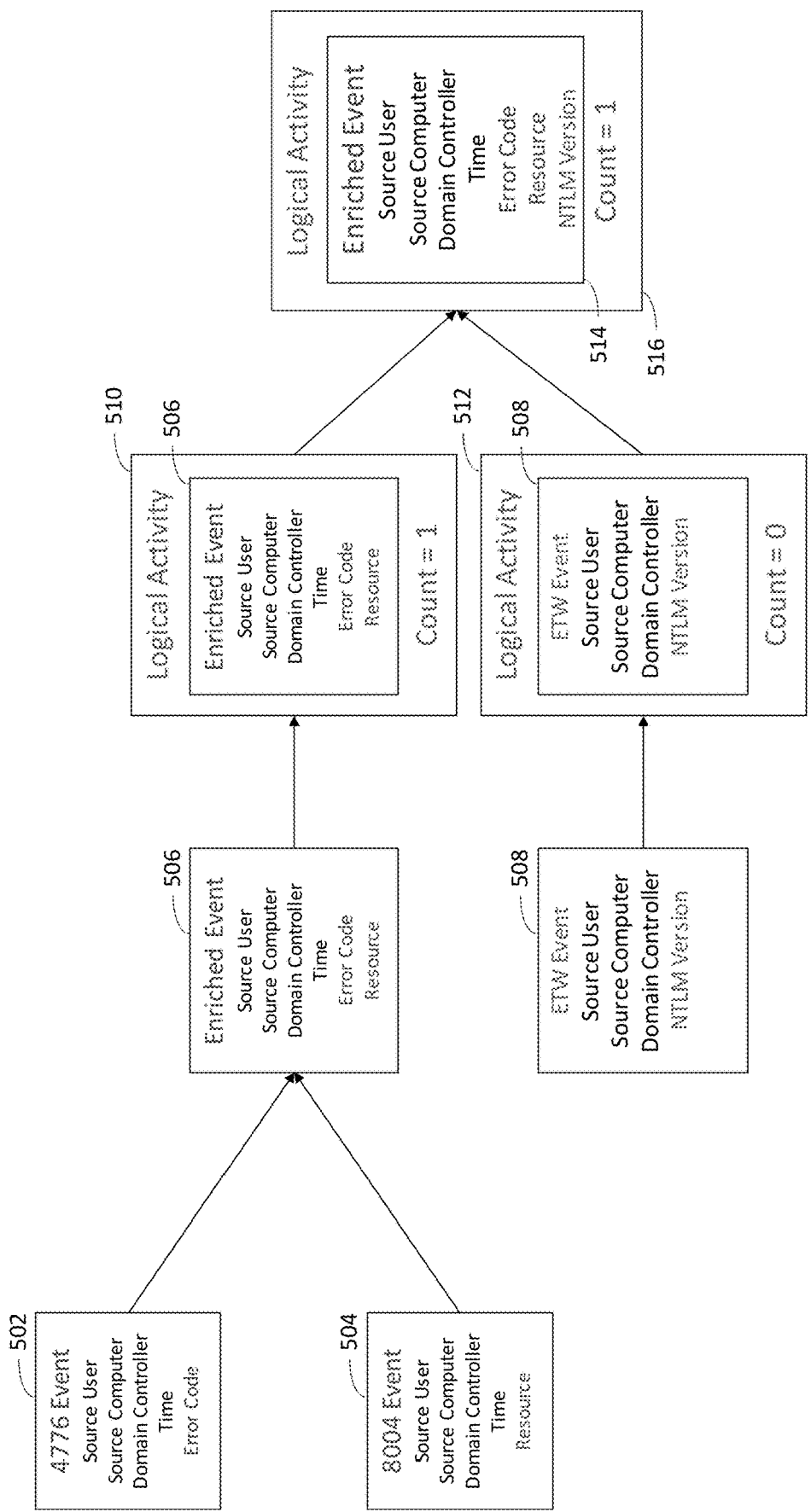
FIGS. 5-7 illustrate example techniques to aggregate events in accordance with embodiments.
Figure 6:
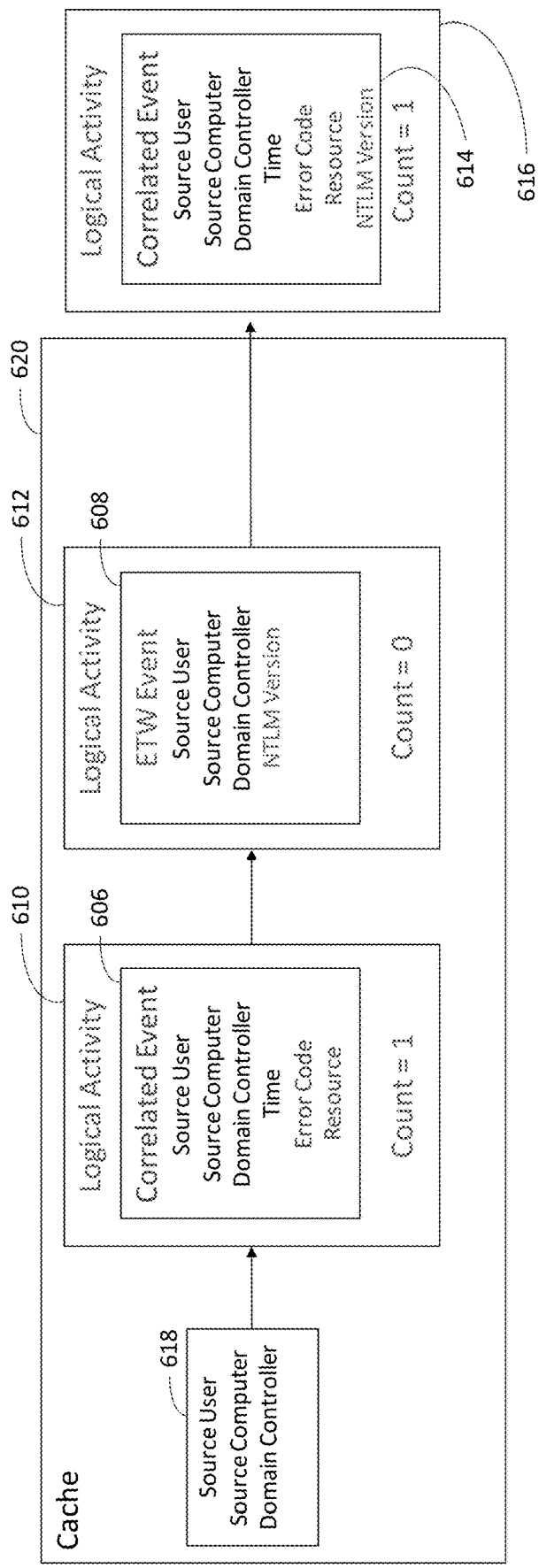
Figure 7:
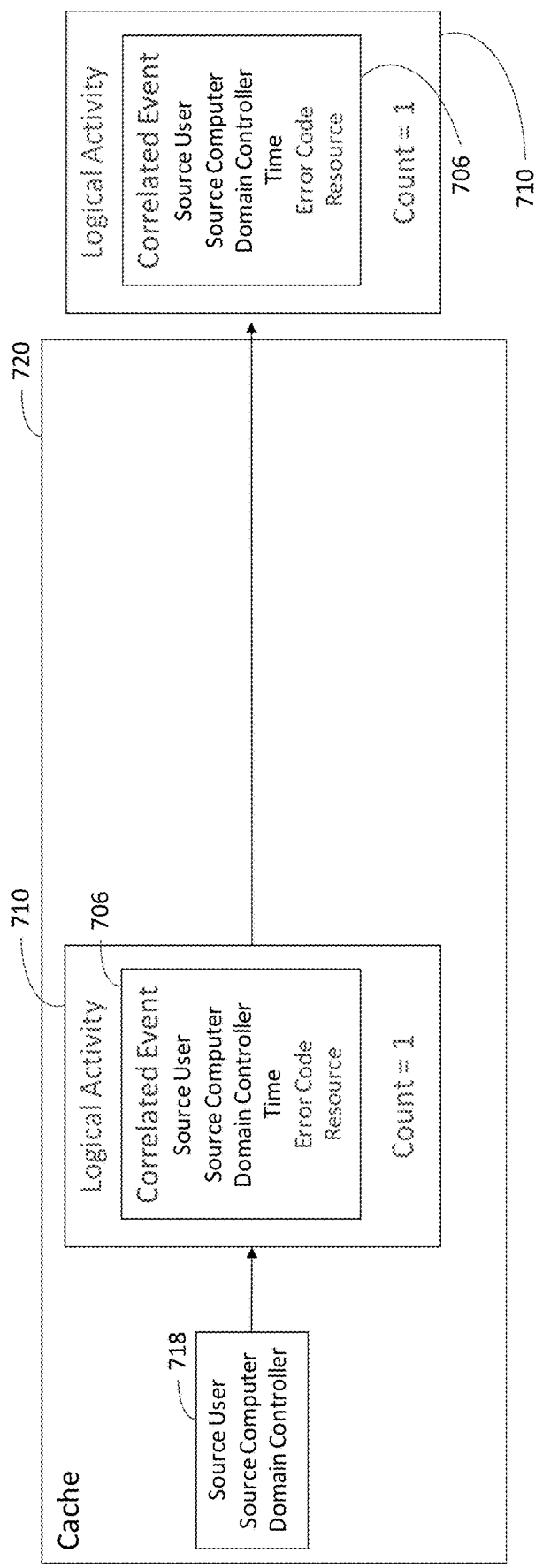

FIGS. 5-7 illustrate example techniques to aggregate events in accordance with embodiments. As shown in FIG. 5, a first security event 502 is depicted as a 4776 event. The first security event 502 indicates a source user, a source computer, a domain controller, a time, and an error code (a.k.a. status) that are associated with a respective attempt to authenticate a user. A second security event 504 is depicted as an 8004 event. The second security event 504 indicates a source user, a source computer, a domain controller, a time, and a resource that are associated with a respective attempt to authenticate a user. It will be recognized that the source user, the source computer, the domain controller, and the time are common among the first and second security events. Accordingly, the first and second security events 502 and 504 are correlated. The first and second security events 502 and 504 are aggregated into an enriched event 506 based at least in part on the first and second security events 502 and 504 being correlated. The enriched event 506 indicates the source user, the source computer, the domain controller, and the time, all of which are common among the first and second security events 502. The enriched event 506 further indicates the error code (as indicated by the first security event 502) and the resource (as indicated by the second security event 504).

The enriched event is associated with logical activity 510, which assigns a count of one to the enriched event 506.

An ETW event indicates a source user, a source computer, a domain controller, and an NTLM version associated with a respective attempt to authenticate a user. The ETW event is associated with logical activity 512, which assigns a count of zero to the ETW event 508. It will be recognized that the source user, the source computer, and the domain controller are common among the enriched event 506 and the ETW event 508. Accordingly, the enriched event 506 and the ETW event 508 are correlated. The enriched event 506 and the ETW event 508 are aggregated into a second enriched event 514 based at least in part on the enriched event 506 and the ETW event 508 being correlated. The second enriched event 514 indicates the source user, the source computer, and the domain controller, all of which are common among the enriched event 506 and the ETW event 508. The second enriched event 514 further indicates the time, the error code, and the resource (as indicated by the enriched event 506) and the NTLM version (as indicated by the ETW event 508). The second enriched event 514 is associated with logical activity 516, which assigns a count that is equal to a sum of the count of the enriched event 506 and the count of the ETW event 508 to the second enriched event 514. Accordingly, the logical activity 516 assigns a count of one (i.e., 1+0=1) to the second enriched event 514.

In an example embodiment, each security event having a count of zero is not included in an authentication report that is generated to describe an authentication process that includes the attempt to authenticate the user that the events shown in FIG. 5 describe. In accordance with this embodiment, the second enriched event 514 is included in the authentication report based at least in part on the second enriched event 514 having a count that is greater than zero. If the enriched event 506 had not been aggregated with the ETW event 508, the enriched event 506 would have been included in the authentication report based at least in part on the enriched event 506 having a count that is greater than zero. However, the second enriched event 514 has priority over the enriched event 506. Thus, in the example of FIG. 5, the second enriched event 514 is included in the authentication report and the enriched event 506 is not included in the authentication report, even though the enriched event 506 also has a count that is greater than zero.

FIG. 6 illustrates that a correlated event 606, which is an aggregation of first and second events, and an ETW event 608 are correlated based at least in part on the correlated event 606 and the ETW event 608 including common identifiers 618. The correlated event 606 and the ETW event 608 are aggregated to provide a second correlated event 614 that includes an aggregation of the identifiers from the correlated event 606 and the ETW event 608. Logical activity 610 is associated with the correlated event 606 to assign a count of one to the correlated event 606. Logical activity 612 is associated with the ETW event 608 to assign a count of zero to the ETW event 608. Logical activity 616 is associated with the second correlated event 614 to assign a count to the second correlated event 614 that is equal to a sum of the count assigned to the correlated event 606 and the count assigned to the ETW event 608. Thus, the logical activity 616 assigns a count of one (i.e., 1+0=1) to the second correlated event 614. The correlated event 606 and the ETW event 608 are shown to be stored in a cache 620 for non-limiting, illustrative purposes. For instance, by storing the correlated event 606 and the ETW event 608 in the cache 620, objects associated with the correlated event 606 and the ETW event 608 may not be written to disk.

FIG. 7 illustrates that a correlated event 706 need not necessarily be aggregated with another security event. For instance, if no other security event includes identifiers that match the identifiers 718 from the correlated event 706, the correlated event 706 cannot be correlated with another security event. Logical activity 710 is associated with the correlated event 706 to assign a count of one to the correlated event 706. The correlated event 706 is included in an authentication report that is generated to describe an authentication process that includes the attempt to authenticate the user that the correlated event 706 describes based at least in part on the count assigned to the correlated event 706 is greater than zero. The correlated event 706 is shown to be stored in a cache 720 for non-limiting, illustrative purposes.

Figure 8:
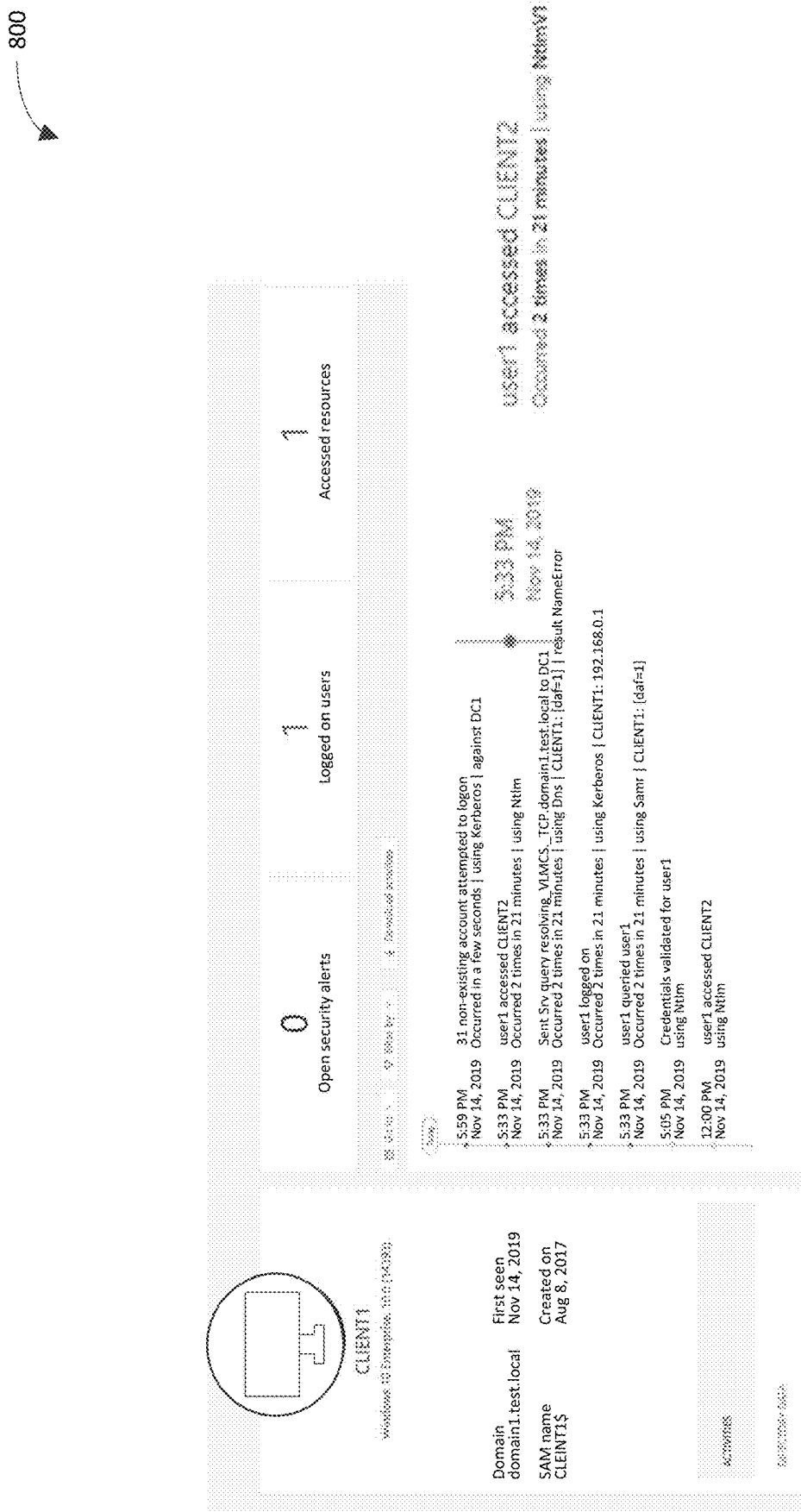
FIGS. 8-10 depict screenshots of example authentication reports in accordance with embodiments.
Figure 9:
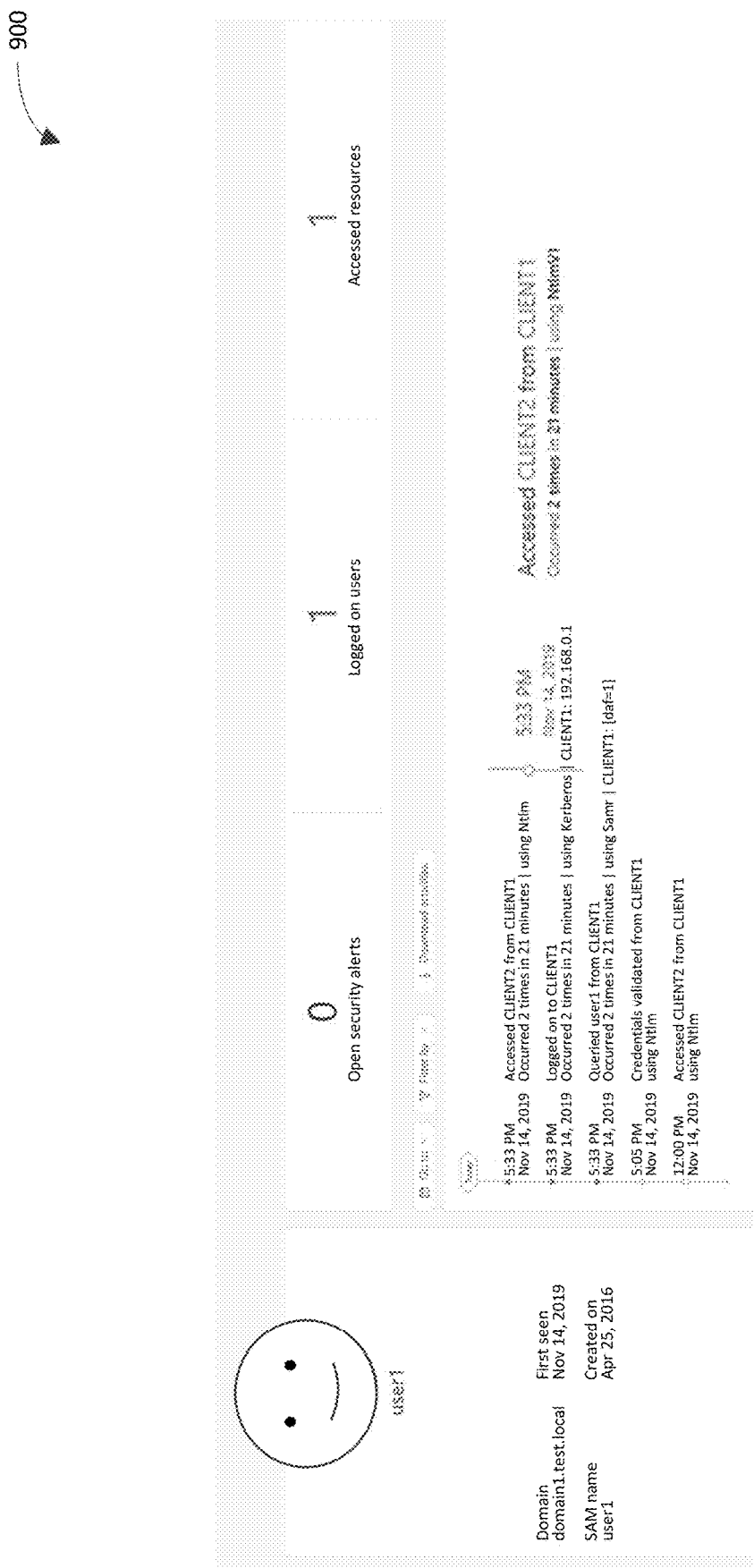
Figure 10:
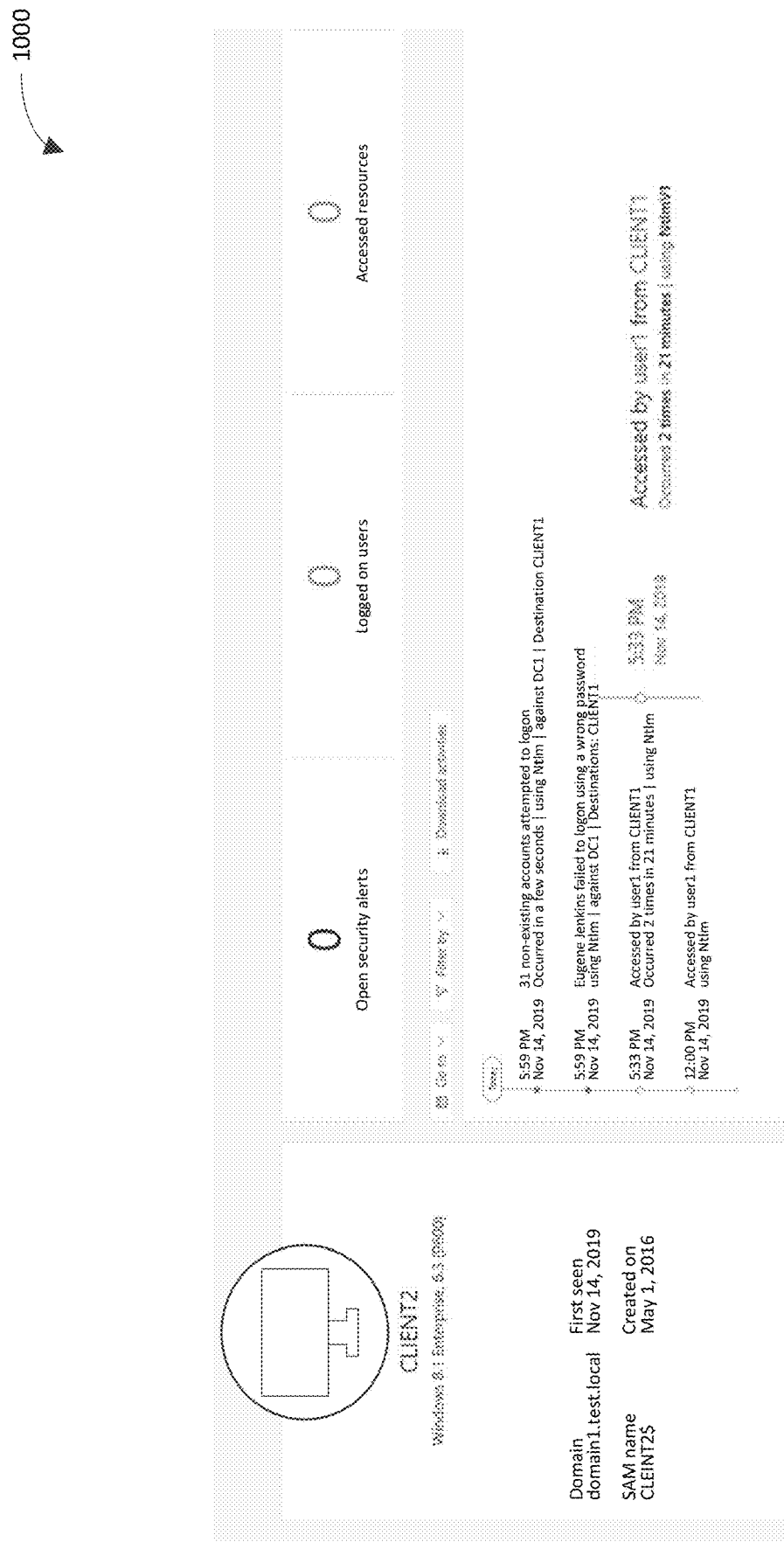

FIGS. 8-10 depict screenshots of example authentication reports 800, 900, 1000 in accordance with embodiments. As shown in FIG. 8, the authentication report 800 shows descriptions of events that occurred with respect to CLIENT1. As shown in FIG. 9, the authentication report 900 shows descriptions of events that occurred with respect to user1. As shown in FIG. 10, the authentication report 1000 shows descriptions of events that occurred with respect to CLIENT2.

Figure 11:
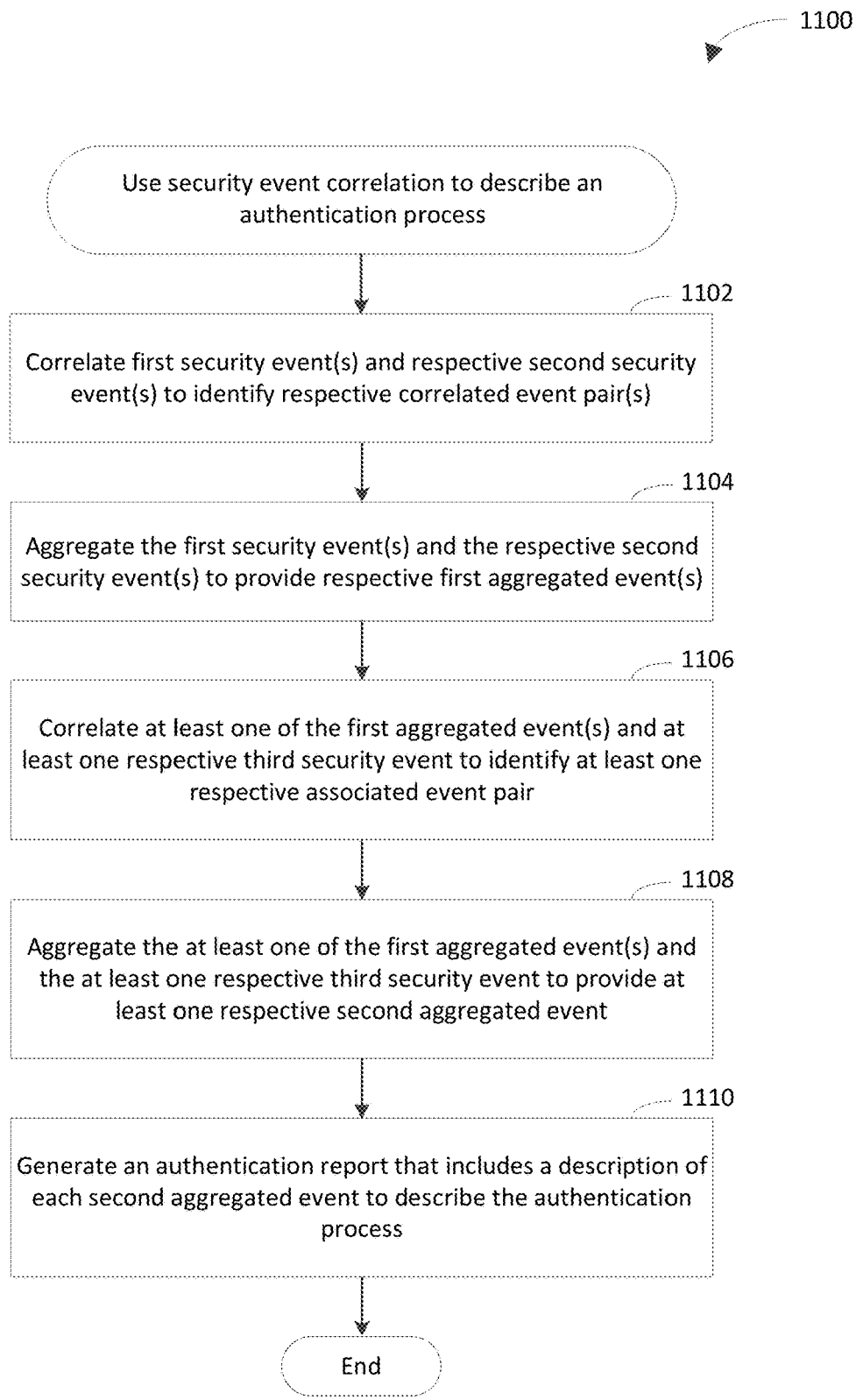
FIG. 11 depicts a flowchart of an example method for using security event correlation to describe an authentication process in accordance with an embodiment.
Figure 12:
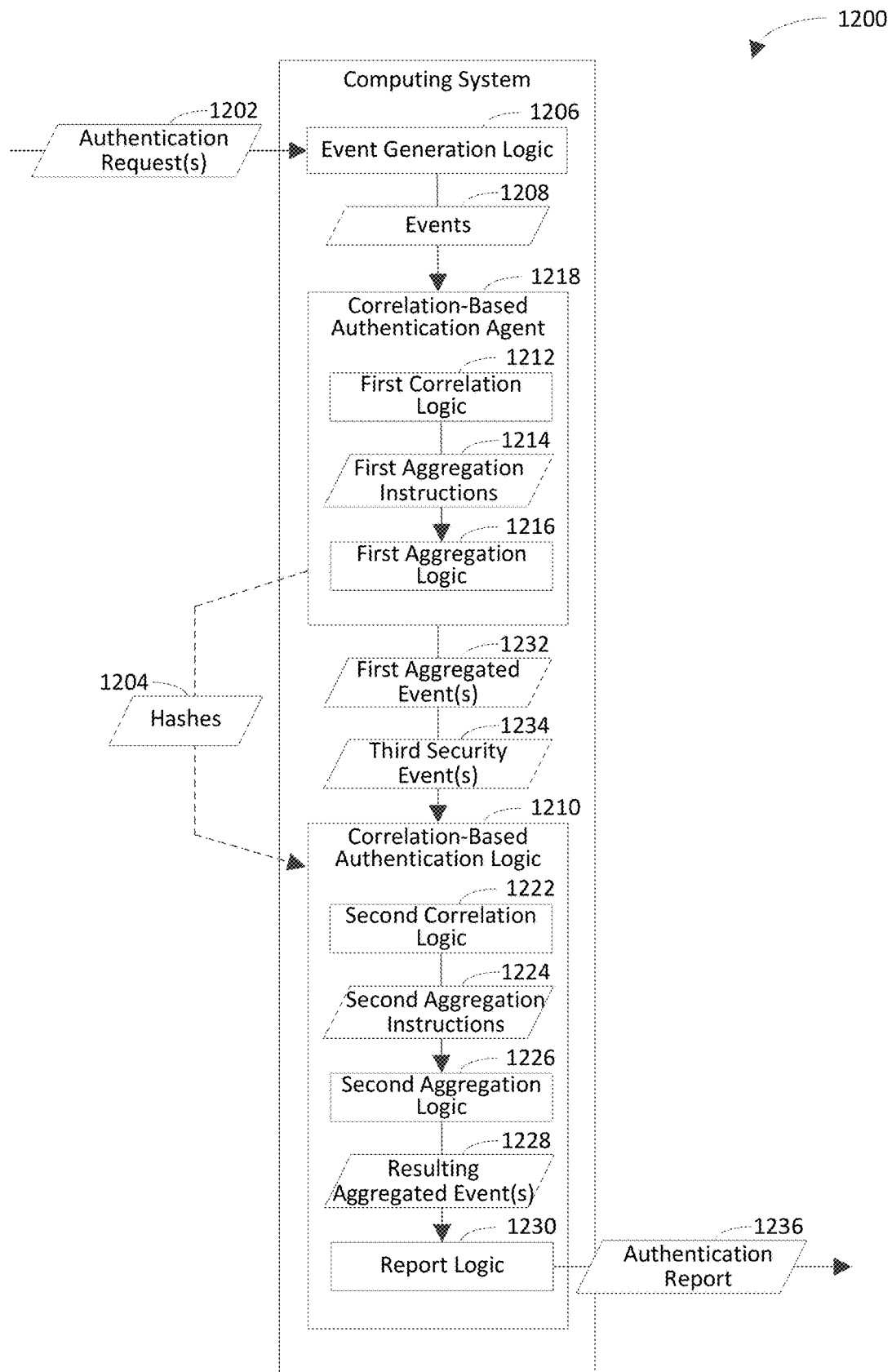
FIGS. 12 and 14 are block diagrams of example computing systems in accordance with embodiments.

FIG. 11 depicts a flowchart 1100 of an example method for using security event correlation to describe an authentication process in accordance with an embodiment. Flowchart 1100 may be performed by correlation-based authentication logic 110 or correlation-based authentication agent 118 shown in FIG. 1 or a combination thereof, for example. For illustrative purposes, flowchart 1100 is described with respect to computing system 1200 shown in FIG. 12, which may be an example implementation of first server(s) 108A, on-premises authentication server 112, or a combination thereof. Computing system 1200 includes event generation logic 1206, correlation-based authentication logic 1210, and correlation-based authentication agent 1218. The correlation-based authentication logic 1210 and the correlation-based authentication agent 1218 are example implementations of the correlation-based authentication logic 110 and the correlation-based authentication agent 118, respectively, shown in FIG. 1. The correlation-based authentication agent 1218 includes first correlation logic 1212 and first aggregation logic 1216. The correlation-based authentication logic 1210 includes second correlation logic 1222, second aggregation logic 1226, and report logic 1230. Further structural and operational embodiments will be apparent to persons skilled in the relevant art(s) based on the discussion regarding flowchart 1100.

As shown in FIG. 11, the method of flowchart 1100 begins at step 1102. In step 1102, first security event(s) and respective second security event(s) are correlated to identify respective correlated event pair(s). The first security event(s) include respective first description(s) that describe respective attempt(s) to authenticate a user using an authentication protocol. The second security event(s) include respective second description(s) that further describe the respective attempt(s) to authenticate the user using the authentication protocol. The first security event(s) and the respective second security event(s) are correlated at step 1102 based at least in part on a portion of the first description in the first security event in each correlated event pair and a portion of the second description in the second security event in the respective correlated event pair being same to define a respective common portion.

In an example implementation, the first correlation logic 1212 correlates the first security event(s) and the respective second security event(s) to identify the respective correlated event pair(s). For example, the event generation logic 1206 may receive authentication request(s) 1202. Receipt of the authentication request(s) 1202 may be said to initiate respective attempt(s) to authenticate user(s). In accordance with this example, the event generation logic 1206 generates events 1208 based at least in part on the authentication request(s) 1202. The events 1208 include the first security event(s), the second security event(s), and third security event(s) 1234. The first correlation logic 1212 may correlate the first security event(s) and the respective second security event(s) in response to (e.g., based at least in part on) receipt of the first security event(s) and the respective second security event(s) from the event generation logic 1206. The first correlation logic 1212 may generate first aggregation instructions 1214 based on (e.g., based at least in part on) the first security events(s) and the respective second security event(s) being correlated. The first aggregation instructions 1214 may instruct the first aggregation logic 1216 to aggregate the first security event(s) and the respective second security event(s).

At step 1104, the first security event(s) and the respective second security event(s) are aggregated to provide respective first aggregated event(s). The first security event(s) and the respective second security event(s) are aggregated at step 1104 based at least in part on the one or more first security events and the one or more respective second security events being correlated. Each first aggregated event includes a first aggregated description that includes an aggregation of the first and second descriptions that are included in the respective first and second security events that are aggregated to provide the respective first aggregated event. In an example implementation, the first aggregation logic 1216 aggregates the first security event(s) and the respective second security event(s) to provide respective first aggregated event(s) 1232 (e.g., in response to receipt of the first aggregation instructions). In accordance with this implementation, the first aggregation logic 1216 may forward the first aggregated event(s) 1232 and the third security event(s) 1234 to the correlation-based authentication logic 1210 for processing.

At step 1106, at least one of the first aggregated event(s) and at least one respective third security event are correlated to identify at least one respective associated event pair. The at least one third security event includes at least one respective third description that describes at least one of the attempt(s) to authenticate the user using the authentication protocol. The at least one of the first aggregated event(s) and at least one respective third security event are correlated at step 1106 based at least in part on a portion of the common portion in the first aggregated description in the first aggregated event in each associated event pair and a portion of the third description in the third security event in the respective associated event pair being same. In an example implementation, the second correlation logic 1222 correlates at least one of the first aggregated event(s) 1232 and the at least one respective third security event to identify the at least one respective associated event pair. The second correlation logic 1222 may correlate at least one of the first aggregated event(s) and the at least one respective third security event in response to (e.g., based at least in part on) receipt of the first aggregated event(s) 1232 and the third security event(s) 1234 from the first aggregation logic 1216. The second correlation logic 1222 may generate second aggregation instructions 1224 based on (e.g., based at least in part on) the at least one of the first aggregated events(s) 1232 and the at least one respective third security event being correlated. The second aggregation instructions 1224 may instruct the second aggregation logic 1226 to aggregate the at least one of the first aggregated event(s) 1232 and the at least one respective third security event.

At step 1108, the at least one of the first aggregated event(s) and the at least one respective third security event are aggregated to provide at least one respective second aggregated event. The at least one of the first aggregated event(s) and the at least one respective third security event are aggregated at step 1108 based at least in part on the at least one of the first aggregated event(s) and the at least one respective third security event being correlated. Each second aggregated event includes a second aggregated description that includes an aggregation of the first aggregated description and the third description that are included in the first aggregated event and the third security event, respectively, that are aggregated to provide the respective second aggregated event. In an example implementation, the second aggregation logic 1226 aggregates the at least one of the first aggregated event(s) 1232 and the at least one respective third security event to provide at least one respective second aggregated event (e.g., in response to receipt of the second aggregation instructions). In accordance with this implementation, the second aggregation logic 1226 may forward resulting aggregated event(s) 1228 to the reporting logic 1230 for processing. The resulting aggregated event(s) 1228 include the at least one second aggregated event. The resulting aggregated event(s) 1228 may further include one or more of the first aggregated event(s) 1232 that are not correlated with one or more respective third security events, though the scope of the example embodiments is not limited in this respect. For instance, the resulting aggregated event(s) 1228 may further include each of the first aggregated event(s) 1232 that is not correlated with a third security event.

At step 1110, an authentication report that includes the second aggregated description of each second aggregated event is generated to describe the authentication process. The authentication report may further include one or more first aggregated descriptions of one or more first aggregated events that are not correlated with one or more respective third security events, though the example embodiments is not limited in this respect. For instance, the authentication report may further include the first aggregated description of each first aggregated event that is not correlated with a third security event. In an example implementation, the reporting logic 1230 generates an authentication report 1236 to include the second aggregated description of each second aggregated event. For example, the reporting logic 1230 may generate the authentication report 1236 in response to receipt of the resulting aggregated event(s) 1228 from the second aggregation logic 1226. In accordance with this implementation, the reporting logic 1230 may generate the authentication report 1236 to further include one or more first aggregated descriptions of one or more respective first aggregated events that are not correlated with one or more respective third security events (e.g., based on the resulting aggregated event(s) 1228 including the one or more first aggregated events). For instance, the reporting logic 1230 may generate the authentication report 1236 to further include the first aggregated description of each first aggregated event that is not correlated with a third security event (e.g., based on the resulting aggregated event(s) 1228 including the respective first aggregated event).

In some example embodiments, one or more steps 1102, 1104, 1106, 1108, and/or 1110 of flowchart 1100 may not be performed. Moreover, steps in addition to or in lieu of steps 1102, 1104, 1106, 1108, and/or 1110 may be performed. For instance, in an example embodiment, the method of flowchart 1100 further includes performing a hash operation on the portion of the common portion in the first aggregated description in each first aggregated event to provide a respective first hash. For example, the first aggregation logic 1216 may perform the hash operation for each first aggregated event to provide the respective first hash. In accordance with this example, the first aggregation logic 1216 may generate hashes 1204 to include each first hash. In accordance with this embodiment, correlating the at least one of the first aggregated event(s) and the at least one respective third security event at step 1106 is based at least in part on the first hash for the first aggregated event in each associated event pair and a hash of a portion of the third description in the third security event in the respective associated event pair being same.

In another example embodiment, the method of flowchart 1100 further includes generating object(s) to represent the respective first aggregated event(s). For instance, the first aggregation logic 1216 may generate the object(s) to represent the respective first aggregated event(s) 1232. In accordance with this embodiment, the method of flowchart 1100 further includes storing the object(s) in memory without writing the object(s) to disk. For instance, the first aggregation logic 1216 may store the object(s) in the memory without writing the object(s) to the disk. Operations may be performed on the first aggregated event(s) by perform the operations on the respective object(s). Thus, in accordance with this embodiment, the first aggregated event(s) are said to be implemented as respective object(s).

In yet another example embodiment, the first description in each first security event includes a first user identifier that indicates the user to whom the respective attempt to authenticate pertains, a first computer identifier that identifies a computer from which an authentication request corresponding to the respective attempt to authenticate the user is received, a first server identifier that identifies an authentication server that generates the first security event, a first timestamp indicating a time at which the respective attempt to authenticate the user occurred, and/or a status indicator that indicates whether the respective attempt to authenticate the user resulted in authentication of the user. In accordance with this embodiment, the second description in each second security event includes a second user identifier that indicates the user to whom the respective attempt to authenticate pertains, a second computer identifier that identifies a computer from which an authentication request corresponding to the respective attempt to authenticate the user is received, a second server identifier that identifies an authentication server that generates the second security event, a second timestamp indicating a time at which the respective attempt to authenticate the user occurred, and/or a resource indicator that indicates a resource that the user attempts to access based at least in part on the respective attempt to authenticate. In further accordance with this embodiment, correlating the first security event(s) and the respective second security event(s) at step 1102 includes correlating the first security event(s) and the respective second security event(s) to identify the respective correlated event pair(s) based at least in part on, for each correlated event pair, the first and second user identifiers therein being same to define a respective common user identifier, the first and second computer identifiers therein being same to define a respective common computer identifier, the first and second server identifiers therein being same to define a respective server identifier, and/or the first and second timestamps therein being same to define a respective common timestamp. In further accordance with this embodiment, the first aggregated description in each first aggregated event includes the respective common user identifier, the respective common computer identifier, the respective common server identifier, the respective common timestamp, the respective status indicator, and/or the respective resource indicator.

In an aspect of this embodiment, the third description in each third security event includes a third user identifier that indicates the user to whom the respective attempt to authenticate pertains, a third computer identifier that identifies a computer from which an authentication request corresponding to the respective attempt to authenticate the user is received, a third server identifier that identifies an authentication server that generates the third security event, and/or a version indicator that indicates a version of the authentication protocol that is used in the respective attempt to authenticate the user that is based at least in part on a length of an authentication response that is received from the user by the authentication server with regard to the respective attempt to authenticate the user. In accordance with this embodiment, correlating at least one of the first aggregated event(s) and the at least one respective third security event at step 1106 includes correlating the at least one of the first aggregated event(s) and the at least one respective third security event to identify the at least one respective associated event pair based at least in part on, for each associated event pair, the common and third user identifiers therein being same, the common and third computer identifiers therein being same, and/or the common and third server identifiers therein being same. In further accordance with this embodiment, the second aggregated description in each second aggregated event includes the respective common user identifier, the respective common computer identifier, the respective common server identifier, the respective common timestamp, the respective status indicator, the respective resource indicator, and/or the respective version indicator.

In an example implementation of this aspect, the authentication process is a new technology LAN manager (NTLM) authentication process. In accordance with this implementation, each version indicator having a first value indicates a first version of the NTLM authentication process based at least in part on the length of the authentication response that is received from the user by the authentication server with regard to the respective attempt to authenticate the user being a specified fixed length. For instance, the specified fixed length may be 24 bytes. In further accordance with this implementation, each version indicator having a second value that is different from the first value indicates a second version of the NTLM authentication process based at least in part on the length of the authentication response that is received from the user by the authentication server with regard to the respective attempt to authenticate the user being greater than the specified fixed length.

In an example of this implementation, the method of flowchart 1100 further includes generating each of the first security event(s) to have an event ID 4776 associated with the NTLM authentication protocol. For instance, the event generation logic 1206 may generate each of the first security event(s) to have the event ID 4776. In accordance with this example, the method of flowchart 1100 further includes generating each of the second security event(s) to have an event ID 8004 associated with the NTLM authentication protocol. For instance, the event generation logic 1206 may generate each of the second security event(s) to have the event ID 8004. It should be noted that if the authentication protocol is another protocol (e.g., a Kerberos authentication protocol) that is different from the NTLM authentication protocol, the first security event(s) and the second security event(s) may be generated to have other event IDs. Examples of other event IDs include but are not limited to event ID 4768, event ID 4769, and event ID 4771.

In another example of this implementation, generating the authentication report at step 1110 includes generating the authentication report that indicates a number of attempts to authenticate the user using the authentication protocol in which the first version of the NTLM authentication protocol is used based at least in part on a number of version indicators that have the first value In yet another example of this implementation, generating the authentication report at step 1110 includes generating the authentication report that indicates a number of attempts to authenticate the user using the authentication protocol that are described by a third security event.

It will be recognized that the computing system 1200 may not include one or more of the components shown therein. Furthermore, the computing system 1200 may include one or more components in addition to or in lieu of any one or more of the components shown therein.

Figure 13:
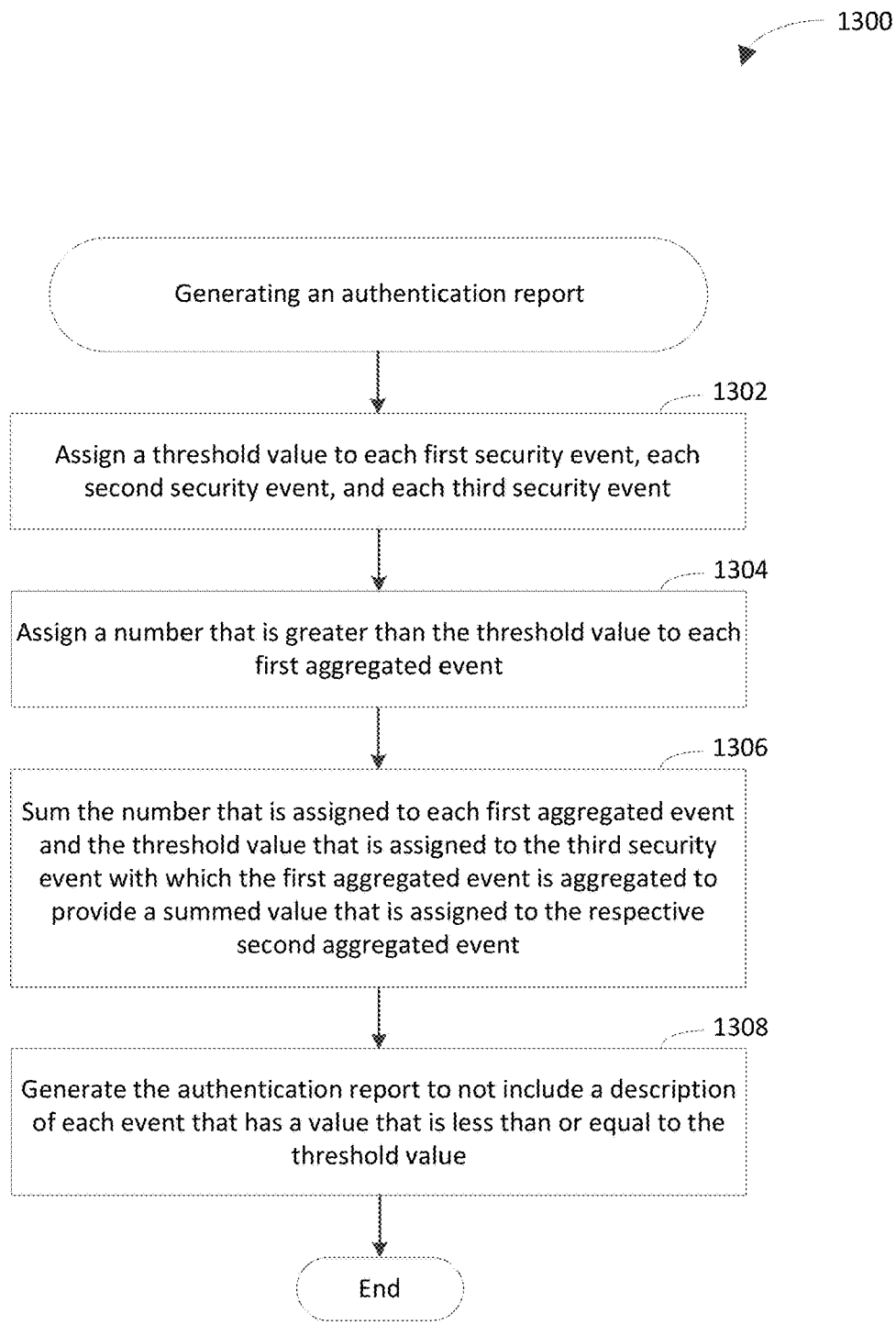
FIG. 13 depicts a flowchart of an example method for generating an authentication report in accordance with an embodiment.
Figure 14:
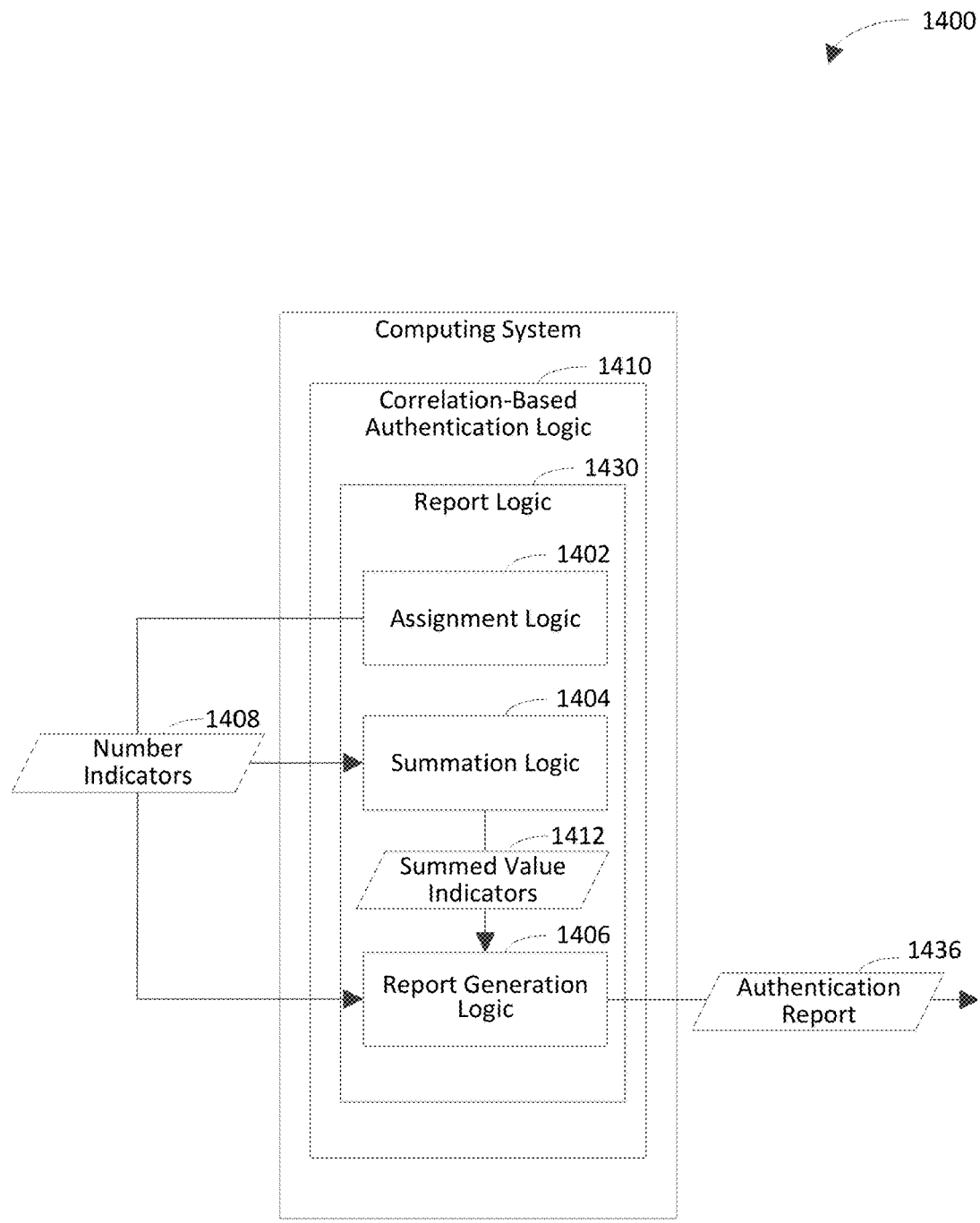

In still another example embodiment, generating the authentication report at step 1110 includes one or more of the steps shown in flowchart 1300 of FIG. 13. Flowchart 1300 may be performed by report logic 1230 shown in FIG. 12, though it will be recognized that any one or more of the steps may be performed by any suitable logic in correlation-based authentication logic 110 or correlation-based authentication agent 118 shown in FIG. 1 or a combination thereof. For illustrative purposes, flowchart 1300 is described with respect to computing system 1400 shown in FIG. 14, which may be an example implementation of first server(s) 108A, on-premises authentication server 112, or a combination thereof. Computing system 1400 includes correlation-based authentication logic 1410, which includes report logic 1430. The report logic 1430 includes assignment logic 1402, summation logic 1404, and report generation logic 1406. Further structural and operational embodiments will be apparent to persons skilled in the relevant art(s) based on the discussion regarding flowchart 1300.

As shown in FIG. 13, the method of flowchart 1300 begins at step 1302. In step 1302, a threshold value is assigned to each first security event, each second security event, and each third security event. For instance, the threshold value may be zero. In an example implementation, the assignment logic 1420 assigns the threshold value to each first security event, each second security event, and each third security event.

At step 1304, a number that is greater than the threshold value is assigned to each first aggregated event. For instance, a value of one may be assigned to each first aggregated event. In an example implementation, the assignment logic 1402 assigns a number that is greater than the threshold value to each first aggregated event. In accordance with this implementation, the assignment logic 1402 may provide number indicators 1408, indicating that the threshold value is assigned to each third security event and further indicating the number that is assigned to each first aggregated event. For instance, the number indicators 1408 may cross-reference each third security event with the threshold value. The number indicators 1408 may further cross-reference each first aggregated event with its assigned number. In further accordance with this implementation, the number indicators 1408 may further indicate that the threshold value is assigned to each first security event and each second security event.

At step 1306, the number that is assigned to each first aggregated event and the threshold value that is assigned to the third security event with which the first aggregated event is aggregated are summed to provide a summed value that is assigned to the respective second aggregated event. In an example implementation, the summation logic 1404 sums the number that is assigned to each first aggregated event and the threshold value that is assigned to the third security event with which the first aggregated event is aggregated to provide a summed value that is assigned to the respective second aggregated event. In accordance with this implementation, the summation logic 1404 may provide summed value indicators 1412, indicating the summed value that is assigned to each second aggregated event. For instance, the summed value indicators 1412 may cross-reference each second aggregated event with its summed value.

At step 1308, the authentication report is generated such that the authentication report does not include a description of each event that has a value that is less than or equal to the threshold value. In an example implementation, the report generation logic 1406 may generate an authentication report 1436 such that the authentication report 1436 does not include a description of each event that has a value that is less than or equal to the threshold value. For example, the report generation logic 1406 may review the number indicators 1408 and the summed value indicators 1412 to determine which events have a value that is less than or equal to the threshold value. In accordance with this example, the report generation logic 1406 may cross-reference each event with its assigned value based on the number indicators 1408 and the summed value indicators 1412 to determine which of the events have a value that is less than or equal to the threshold value.

It will be recognized that the computing system 1400 may not include one or more of the components shown therein. Furthermore, the computing system 1400 may include one or more components in addition to or in lieu of any one or more of the components shown therein.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of correlation-based authentication logic 110, correlation-based authentication agent 118, correlation-based authentication logic 210, correlation-based authentication agent 218, event generation logic 1206, correlation-based authentication logic 1210, first correlation logic 1212, first aggregation logic 1216, correlation-based authentication agent 1218, second correlation logic 1222, second aggregation logic 1226, report logic 1230, assignment logic 1402, summation logic 1404, report generation logic 1406, activity diagram 200, flowchart 1100, and/or flowchart 1300 may be implemented in hardware, software, firmware, or any combination thereof.

For example, any one or more of correlation-based authentication logic 110, correlation-based authentication agent 118, correlation-based authentication logic 210, correlation-based authentication agent 218, event generation logic 1206, correlation-based authentication logic 1210, first correlation logic 1212, first aggregation logic 1216, correlation-based authentication agent 1218, second correlation logic 1222, second aggregation logic 1226, report logic 1230, assignment logic 1402, summation logic 1404, report generation logic 1406, activity diagram 200, flowchart 1100, and/or flowchart 1300 may be implemented, at least in part, as computer program code configured to be executed in one or more processors.

In another example, any one or more of correlation-based authentication logic 110, correlation-based authentication agent 118, correlation-based authentication logic 210, correlation-based authentication agent 218, event generation logic 1206, correlation-based authentication logic 1210, first correlation logic 1212, first aggregation logic 1216, correlation-based authentication agent 1218, second correlation logic 1222, second aggregation logic 1226, report logic 1230, assignment logic 1402, summation logic 1404, report generation logic 1406, activity diagram 200, flowchart 1100, and/or flowchart 1300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example system to use security event correlation to describe an authentication process comprises memory and one or more processors coupled to the memory. The one or more processors are configured to correlate one or more first security events that include one or more respective first descriptions that describe one or more respective attempts to authenticate a user using an authentication protocol and one or more respective second security events that include one or more respective second descriptions that further describe the one or more respective attempts to authenticate the user using the authentication protocol to identify one or more respective correlated event pairs based at least in part on a portion of the first description in the first security event in each correlated event pair and a portion of the second description in the second security event in the respective correlated event pair being same to define a respective common portion. The one or more processors are further configured to aggregate the one or more first security events and the one or more respective second security events to provide one or more respective first aggregated events based at least in part on the one or more first security events and the one or more respective second security events being correlated. Each first aggregated event includes a first aggregated description that includes an aggregation of the first and second descriptions that are included in the respective first and second security events that are aggregated to provide the respective first aggregated event. The one or more processors are further configured to correlate at least one of the one or more first aggregated events and at least one respective third security event that includes at least one respective third description that describes at least one of the one or more attempts to authenticate the user using the authentication protocol to identify at least one respective associated event pair based at least in part on a portion of the common portion in the first aggregated description in the first aggregated event in each associated event pair and a portion of the third description in the third security event in the respective associated event pair being same. The one or more processors are further configured to aggregate the at least one of the one or more first aggregated events and the at least one respective third security event to provide at least one respective second aggregated event based at least in part on the at least one of the one or more first aggregated events and the at least one respective third security event being correlated. Each second aggregated event includes a second aggregated description that includes an aggregation of the first aggregated description and the third description that are included in the first aggregated event and the third security event, respectively, that are aggregated to provide the respective second aggregated event. The one or more processors are further configured to generate an authentication report that includes the second aggregated description of each second aggregated event to describe the authentication process.

In a first aspect of the example system, the one or more processors are configured to generate the authentication report that further includes the first aggregated description of each first aggregated event that is not correlated with a third security event, to further describe the authentication process.

In a second aspect of the example system, the first description in each first security event includes a first user identifier that indicates the user to whom the respective attempt to authenticate pertains, a first computer identifier that identifies a computer from which an authentication request corresponding to the respective attempt to authenticate the user is received, a first server identifier that identifies an authentication server that generates the first security event, a first timestamp indicating a time at which the respective attempt to authenticate the user occurred, and a status indicator that indicates whether the respective attempt to authenticate the user resulted in authentication of the user. In accordance with the second aspect, the second description in each second security event includes a second user identifier that indicates the user to whom the respective attempt to authenticate pertains, a second computer identifier that identifies a computer from which an authentication request corresponding to the respective attempt to authenticate the user is received, a second server identifier that identifies an authentication server that generates the second security event, a second timestamp indicating a time at which the respective attempt to authenticate the user occurred, and a resource indicator that indicates a resource that the user attempts to access based at least in part on the respective attempt to authenticate. In further accordance with the second aspect, the one or more processors are configured to correlate the one or more first security events and the one or more respective second security events to identify the one or more respective correlated event pairs based at least in part on, for each correlated event pair, the first and second user identifiers therein being same to define a respective common user identifier, the first and second computer identifiers therein being same to define a respective common computer identifier, the first and second server identifiers therein being same to define a respective server identifier, and the first and second timestamp therein being same to define a respective common timestamp. In further accordance with the second aspect, the first aggregated description in each first aggregated event includes the respective common user identifier, the respective common computer identifier, the respective common server identifier, the respective common timestamp, the respective status indicator, and the respective resource indicator. The second aspect of the example system may be implemented in combination with the first aspect of the example system, though the example embodiments are not limited in this respect.

In an implementation of the second aspect of the example system, the third description in each third security event includes a third user identifier that indicates the user to whom the respective attempt to authenticate pertains, a third computer identifier that identifies a computer from which an authentication request corresponding to the respective attempt to authenticate the user is received, a third server identifier that identifies an authentication server that generates the third security event, and a version indicator that indicates a version of the authentication protocol that is used in the respective attempt to authenticate the user that is based at least in part on a length of an authentication response that is received from the user by the authentication server with regard to the respective attempt to authenticate the user. In accordance with this implementation, the one or more processors are configured to correlate the at least one of the one or more first aggregated events and the at least one respective third security event to identify the at least one respective associated event pair based at least in part on, for each associated event pair, the common and third user identifiers therein being same, the common and third computer identifiers therein being same, and the common and third server identifiers therein being same. In further accordance with this implementation, the second aggregated description in each second aggregated event includes the respective common user identifier, the respective common computer identifier, the respective common server identifier, the respective common timestamp, the respective status indicator, the respective resource indicator, and the respective version indicator.

In an example of this implementation, the authentication process is a new technology LAN manager (NTLM) authentication process. In accordance with this example, each version indicator having a first value indicates a first version of the NTLM authentication process based at least in part on the length of the authentication response that is received from the user by the authentication server with regard to the respective attempt to authenticate the user being a specified fixed length. In further accordance with this example, each version indicator having a second value that is different from the first value indicates a second version of the NTLM authentication process based at least in part on the length of the authentication response that is received from the user by the authentication server with regard to the respective attempt to authenticate the user being greater than the specified fixed length.

In a first instance of this example, the one or more processors are configured to generate each of the one or more first security events to have an event ID 4776 associated with the NTLM authentication protocol. In accordance with the first aspect, the one or more processors are configured to generate each of the one or more second security events to have an event ID 8004 associated with the NTLM authentication protocol.

In a second instance of this example, the one or more processors are configured to generate the authentication report that indicates a number of attempts to authenticate the user using the authentication protocol in which the first version of the NTLM authentication protocol is used based at least in part on a number of version indicators that have the first value.

In a third instance of this example, the one or more processors are configured to generate the authentication report that indicates a number of attempts to authenticate the user using the authentication protocol that are described by a third security event.

In a third aspect of the example system, the one or more processors are configured to perform a hash operation on the portion of the common portion in the first aggregated description in each first aggregated event to provide a respective first hash. In accordance with the third aspect, the one or more processors are configured to correlate the at least one of the one or more first aggregated events and the at least one respective third security event based at least in part on the first hash for the first aggregated event in each associated event pair and a hash of a portion of the third description in the third security event in the respective associated event pair being same. The third aspect of the example system may be implemented in combination with the first and/or second aspect of the example system, though the example embodiments are not limited in this respect.

In a fourth aspect, the one or more processors are configured to generate one or more objects to represent the one or more respective first aggregated events. In accordance with the fourth aspect, the one or more processors are configured to store the one or more objects in memory without writing the one or more objects to disk. The fourth aspect of the example system may be implemented in combination with the first, second, and/or third aspect of the example system, though the example embodiments are not limited in this respect.

In a fifth aspect of the example system, the one or more processors are configured to assign a threshold value to each first security event, each second security event, and each third security event. In accordance with the fifth aspect, the one or more processors are configured to assign a number that is greater than the threshold value to each first aggregated event. In further accordance with the fifth aspect, the one or more processors are configured to sum the number that is assigned to each first aggregated event and the threshold value that is assigned to the third security event with which the first aggregated event is aggregated to provide a summed value that is assigned to the respective second aggregated event. In further accordance with the fifth aspect, the one or more processors are configured to generate the authentication report to not include a description of each event that has a value that is less than or equal to the threshold value. The fifth aspect of the example system may be implemented in combination with the first, second, third, and/or fourth aspect of the example system, though the example embodiments are not limited in this respect.

In an example method of using security event correlation to describe an authentication process, one or more first security events that include one or more respective first descriptions that describe one or more respective attempts to authenticate a user using an authentication protocol and one or more respective second security events that include one or more respective second descriptions that further describe the one or more respective attempts to authenticate the user using the authentication protocol are correlated to identify one or more respective correlated event pairs based at least in part on a portion of the first description in the first security event in each correlated event pair and a portion of the second description in the second security event in the respective correlated event pair being same to define a respective common portion. The one or more first security events and the one or more respective second security events are aggregated to provide one or more respective first aggregated events based at least in part on the one or more first security events and the one or more respective second security events being correlated. Each first aggregated event includes a first aggregated description that includes an aggregation of the first and second descriptions that are included in the respective first and second security events that are aggregated to provide the respective first aggregated event. At least one of the one or more first aggregated events and at least one respective third security event that includes at least one respective third description that describes at least one of the one or more attempts to authenticate the user using the authentication protocol are correlated to identify at least one respective associated event pair based at least in part on a portion of the common portion in the first aggregated description in the first aggregated event in each associated event pair and a portion of the third description in the third security event in the respective associated event pair being same. The at least one of the one or more first aggregated events and the at least one respective third security event are aggregated to provide at least one respective second aggregated event based at least in part on the at least one of the one or more first aggregated events and the at least one respective third security event being correlated. Each second aggregated event includes a second aggregated description that includes an aggregation of the first aggregated description and the third description that are included in the first aggregated event and the third security event, respectively, that are aggregated to provide the respective second aggregated event. An authentication report that includes the second aggregated description of each second aggregated event is generated to describe the authentication process.

In a first aspect of the example method, generating the authentication report comprises generating the authentication report that further includes the first aggregated description of each first aggregated event that is not correlated with a third security event, to further describe the authentication process.

In a second aspect of the example method, the first description in each first security event includes a first user identifier that indicates the user to whom the respective attempt to authenticate pertains, a first computer identifier that identifies a computer from which an authentication request corresponding to the respective attempt to authenticate the user is received, a first server identifier that identifies an authentication server that generates the first security event, a first timestamp indicating a time at which the respective attempt to authenticate the user occurred, and a status indicator that indicates whether the respective attempt to authenticate the user resulted in authentication of the user. In accordance with the second aspect, the second description in each second security event includes a second user identifier that indicates the user to whom the respective attempt to authenticate pertains, a second computer identifier that identifies a computer from which an authentication request corresponding to the respective attempt to authenticate the user is received, a second server identifier that identifies an authentication server that generates the second security event, a second timestamp indicating a time at which the respective attempt to authenticate the user occurred, and a resource indicator that indicates a resource that the user attempts to access based at least in part on the respective attempt to authenticate. In further accordance with the second aspect, correlating the one or more first security events and the one or more respective second security events comprises correlating the one or more first security events and the one or more respective second security events to identify the one or more respective correlated event pairs based at least in part on, for each correlated event pair, the first and second user identifiers therein being same to define a respective common user identifier, the first and second computer identifiers therein being same to define a respective common computer identifier, the first and second server identifiers therein being same to define a respective server identifier, and the first and second timestamp therein being same to define a respective common timestamp. In further accordance with the second aspect, the first aggregated description in each first aggregated event includes the respective common user identifier, the respective common computer identifier, the respective common server identifier, the respective common timestamp, the respective status indicator, and the respective resource indicator. The second aspect of the example method may be implemented in combination with the first aspect of the example method, though the example embodiments are not limited in this respect.

In an implementation of the second aspect of the example method, the third description in each third security event includes a third user identifier that indicates the user to whom the respective attempt to authenticate pertains, a third computer identifier that identifies a computer from which an authentication request corresponding to the respective attempt to authenticate the user is received, a third server identifier that identifies an authentication server that generates the third security event, and a version indicator that indicates a version of the authentication protocol that is used in the respective attempt to authenticate the user that is based at least in part on a length of an authentication response that is received from the user by the authentication server with regard to the respective attempt to authenticate the user. In accordance with this implementation, correlating the at least one of the one or more first aggregated events and the at least one respective third security event comprises correlating the at least one of the one or more first aggregated events and the at least one respective third security event to identify the at least one respective associated event pair based at least in part on, for each associated event pair, the common and third user identifiers therein being same, the common and third computer identifiers therein being same, and the common and third server identifiers therein being same. In further accordance with this implementation, the second aggregated description in each second aggregated event includes the respective common user identifier, the respective common computer identifier, the respective common server identifier, the respective common timestamp, the respective status indicator, the respective resource indicator, and the respective version indicator.

In an example of this implementation, the authentication process is a new technology LAN manager (NTLM) authentication process. In accordance with this example, each version indicator having a first value indicates a first version of the NTLM authentication process based at least in part on the length of the authentication response that is received from the user by the authentication server with regard to the respective attempt to authenticate the user being a specified fixed length. In further accordance with this example, each version indicator having a second value that is different from the first value indicates a second version of the NTLM authentication process based at least in part on the length of the authentication response that is received from the user by the authentication server with regard to the respective attempt to authenticate the user being greater than the specified fixed length.

In a first instance of this example, the example method further comprises generating each of the one or more first security events to have an event ID 4776 associated with the NTLM authentication protocol. In accordance with the first aspect, the example method further comprises generating each of the one or more second security events to have an event ID 8004 associated with the NTLM authentication protocol.

In a second instance of this example, generating the authentication report comprises generating the authentication report that indicates a number of attempts to authenticate the user using the authentication protocol in which the first version of the NTLM authentication protocol is used based at least in part on a number of version indicators that have the first value.

In a third instance of this example, generating the authentication report comprises generating the authentication report that indicates a number of attempts to authenticate the user using the authentication protocol that are described by a third security event.

In a third aspect of the example method, the example method further comprises performing a hash operation on the portion of the common portion in the first aggregated description in each first aggregated event to provide a respective first hash. In accordance with the third aspect, correlating the at least one of the one or more first aggregated events and the at least one respective third security event comprises correlating the at least one of the one or more first aggregated events and the at least one respective third security event based at least in part on the first hash for the first aggregated event in each associated event pair and a hash of a portion of the third description in the third security event in the respective associated event pair being same. The third aspect of the example method may be implemented in combination with the first and/or second aspect of the example method, though the example embodiments are not limited in this respect.

In a fourth aspect, the example method further comprises generating one or more objects to represent the one or more respective first aggregated events. In accordance with the fourth aspect, the example method further comprises storing the one or more objects in memory without writing the one or more objects to disk. The fourth aspect of the example method may be implemented in combination with the first, second, and/or third aspect of the example method, though the example embodiments are not limited in this respect.

In a fifth aspect of the example method, generating the authentication report comprises assigning a threshold value to each first security event, each second security event, and each third security event. In accordance with the fifth aspect, generating the authentication report comprises assigning a number that is greater than the threshold value to each first aggregated event. In further accordance with the fifth aspect, generating the authentication report comprises summing the number that is assigned to each first aggregated event and the threshold value that is assigned to the third security event with which the first aggregated event is aggregated to provide a summed value that is assigned to the respective second aggregated event. In further accordance with the fifth aspect, generating the authentication report comprises generating the authentication report to not include a description of each event that has a value that is less than or equal to the threshold value. The fifth aspect of the example method may be implemented in combination with the first, second, third, and/or fourth aspect of the example method, though the example embodiments are not limited in this respect.

An example computer program product comprises a computer-readable storage medium having instructions recorded thereon for enabling a processor-based system to perform operations to use security event correlation to describe an authentication process. The operations comprise correlate one or more first security events that include one or more respective first descriptions that describe one or more respective attempts to authenticate a user using an authentication protocol and one or more respective second security events that include one or more respective second descriptions that further describe the one or more respective attempts to authenticate the user using the authentication protocol to identify one or more respective correlated event pairs based at least in part on a portion of the first description in the first security event in each correlated event pair and a portion of the second description in the second security event in the respective correlated event pair being same to define a respective common portion. The operations further comprise aggregate the one or more first security events and the one or more respective second security events to provide one or more respective first aggregated events based at least in part on the one or more first security events and the one or more respective second security events being correlated. Each first aggregated event includes a first aggregated description that includes an aggregation of the first and second descriptions that are included in the respective first and second security events that are aggregated to provide the respective first aggregated event. The operations further comprise correlate at least one of the one or more first aggregated events and at least one respective third security event that includes at least one respective third description that describes at least one of the one or more attempts to authenticate the user using the authentication protocol to identify at least one respective associated event pair based at least in part on a portion of the common portion in the first aggregated description in the first aggregated event in each associated event pair and a portion of the third description in the third security event in the respective associated event pair being same. The operations further comprise aggregate the at least one of the one or more first aggregated events and the at least one respective third security event to provide at least one respective second aggregated event based at least in part on the at least one of the one or more first aggregated events and the at least one respective third security event being correlated. Each second aggregated event includes a second aggregated description that includes an aggregation of the first aggregated description and the third description that are included in the first aggregated event and the third security event, respectively, that are aggregated to provide the respective second aggregated event. The operations further comprise generate an authentication report that includes the second aggregated description of each second aggregated event to describe the authentication process.

IV. Example Computer System

Figure 15:
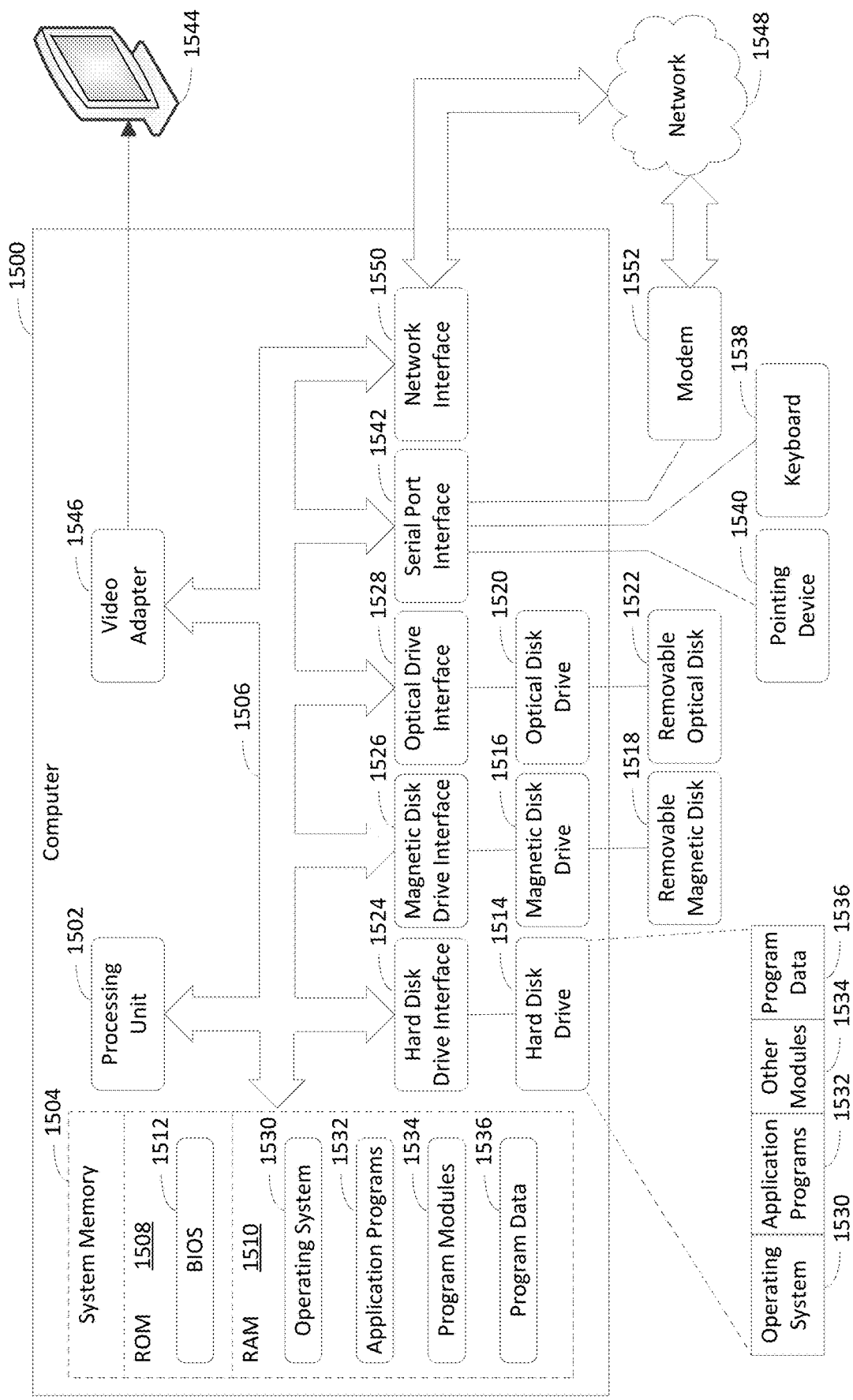
FIG. 15 depicts an example computer in which embodiments may be implemented.

FIG. 15 depicts an example computer 1500 in which embodiments may be implemented. Any one or more of servers 108A-108N, on-premises authentication server 112, and/or any one or more of user devices 116A-116M shown in FIG. 1; authentication server 212 and/or user device 216 shown in FIG. 2; computing system 1200 shown in FIG. 12; and/or computing system 1400 shown in FIG. 14 may be implemented using computer 1500, including one or more features of computer 1500 and/or alternative features. Computer 1500 may be a general-purpose computing device in the form of a conventional personal computer, a mobile computer, or a workstation, for example, or computer 1500 may be a special purpose computing device. The description of computer 1500 provided herein is provided for purposes of illustration, and is not intended to be limiting. Embodiments may be implemented in further types of computer systems, as would be known to persons skilled in the relevant art(s).

As shown in FIG. 15, computer 1500 includes a processing unit 1502, a system memory 1504, and a bus 1506 that couples various system components including system memory 1504 to processing unit 1502. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computer 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1530, one or more application programs 1532, other program modules 1534, and program data 1536. Application programs 1532 or program modules 1534 may include, for example, computer program logic for implementing any one or more of (e.g., at least a portion of) correlation-based authentication logic 110, correlation-based authentication agent 118, correlation-based authentication logic 210, correlation-based authentication agent 218, event generation logic 1206, correlation-based authentication logic 1210, first correlation logic 1212, first aggregation logic 1216, correlation-based authentication agent 1218, second correlation logic 1222, second aggregation logic 1226, report logic 1230, assignment logic 1402, summation logic 1404, report generation logic 1406, activity diagram 200 (including any activity of activity diagram 200), flowchart 1100 (including any step of flowchart 1100), and/or flowchart 1300 (including any step of flowchart 1300), as described herein.

A user may enter commands and information into the computer 1500 through input devices such as keyboard 1538 and pointing device 1540. Other input devices (not shown) may include a microphone, joystick, game pad, satellite dish, scanner, touch screen, camera, accelerometer, gyroscope, or the like. These and other input devices are often connected to the processing unit 1502 through a serial port interface 1542 that is coupled to bus 1506, but may be connected by other interfaces, such as a parallel port, game port, or a universal serial bus (USB).

A display device 1544 (e.g., a monitor) is also connected to bus 1506 via an interface, such as a video adapter 1546. In addition to display device 1544, computer 1500 may include other peripheral output devices (not shown) such as speakers and printers.

Computer 1500 is connected to a network 1548 (e.g., the Internet) through a network interface or adapter 1550, a modem 1552, or other means for establishing communications over the network. Modem 1552, which may be internal or external, is connected to bus 1506 via serial port interface 1542.

As used herein, the terms "computer program medium" and "computer-readable storage medium" are used to generally refer to media (e.g., non-transitory media) such as the hard disk associated with hard disk drive 1514, removable magnetic disk 1518, removable optical disk 1522, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1532 and other program modules 1534) may be stored on the hard disk, magnetic disk, optical disk, ROM, or RAM. Such computer programs may also be received via network interface 1550 or serial port interface 1542. Such computer programs, when executed or loaded by an application, enable computer 1500 to implement features of embodiments discussed herein. Accordingly, such computer programs represent controllers of the computer 1500.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. CONCLUSION

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to use security event correlation to describe an authentication process, the system comprising:
   memory; and
   a processing unit coupled to the memory, the processing unit configured to:
      correlate a first security event that includes a first description that describes a particular attempt to authenticate a user, which is initiated by a particular authentication request regarding the user, using an authentication protocol and a second security event that includes a second description that further describes the particular attempt to authenticate the user, which is initiated by the particular authentication request regarding the user, using the authentication protocol to identify a correlated event pair based at least in part on a portion of the first description and a portion of the second description being same to define a common portion;
      aggregate the first security event and the second security event to provide a first aggregated event based at least in part on the first security event and the second security event being correlated, the first aggregated event including a first aggregated description that includes an aggregation of the first and second descriptions that are included in the respective first and second security events;
      correlate the first aggregated event and a third security event that includes a third description that describes the particular attempt to authenticate the user, which is initiated by the particular authentication request regarding the user, using the authentication protocol to identify an associated event pair based at least in part on a portion of the common portion in the first aggregated description in the first aggregated event and a portion of the third description in the third security event being same;
      aggregate the first aggregated event and the third security event to provide a second aggregated event based at least in part on the first aggregated event and the third security event being correlated, the second aggregated event including a second aggregated description that includes an aggregation of the first aggregated description and the third description that are included in the first aggregated event and the third security event, respectively; and
      generate an authentication report that includes the second aggregated description of the second aggregated event to describe the authentication process.

2. The system of claim 1, wherein the first description in the first security event includes a first user identifier that indicates the user to whom the particular attempt to authenticate pertains, a first computer identifier that identifies a computer from which the particular authentication request corresponding to the particular attempt to authenticate the user is received, a first server identifier that identifies an authentication server that generates the first security event, a first timestamp indicating a time at which the particular attempt to authenticate the user occurred, and a status indicator that indicates whether the particular attempt to authenticate the user resulted in authentication of the user;
   wherein the second description in the second security event includes a second user identifier that indicates the user to whom the particular attempt to authenticate pertains, a second computer identifier that identifies a computer from which the particular authentication request corresponding to the particular attempt to authenticate the user is received, a second server identifier that identifies an authentication server that generates the second security event, a second timestamp indicating a time at which the particular attempt to authenticate the user occurred, and a resource indicator that indicates a resource that the user attempts to access based at least in part on the particular attempt to authenticate;
   wherein the processing unit is configured to:
      correlate the first security event and the second security event to identify the correlated event pair based at least in part on the first and second user identifiers therein being same to define a common user identifier, the first and second computer identifiers therein being same to define a common computer identifier, the first and second server identifiers therein being same to define a common server identifier, and the first and second timestamps therein being same to define a common timestamp; and wherein the first aggregated description in the first aggregated event includes the common user identifier, the common computer identifier, the common server identifier, the common timestamp, the status indicator, and the resource indicator.

3. The system of claim 2, wherein the third description in the third security event includes a third user identifier that indicates the user to whom the particular attempt to authenticate pertains, a third computer identifier that identifies a computer from which the particular authentication request corresponding to the particular attempt to authenticate the user is received, a third server identifier that identifies an authentication server that generates the third security event, and a version indicator that indicates a version of the authentication protocol that is used in the particular attempt to authenticate the user that is based at least in part on a length of an authentication response that is received from the user by the authentication server with regard to the particular attempt to authenticate the user;

wherein the processing unit is configured to:
correlate the first aggregated event and the third security event to identify the associated event pair based at least in part on the common and third user identifiers therein being same, the common and third computer identifiers therein being same, and the common and third server identifiers therein being same; and wherein the second aggregated description in the second aggregated event includes the common user identifier, the common computer identifier, the common server identifier, the common timestamp, the status indicator, the resource indicator, and the version indicator.

4. The system of claim 3, wherein the authentication process is a new technology LAN manager (NTLM) authentication process;

wherein the version indicator having a first value indicates a first version of the NTLM authentication process based at least in part on the length of the authentication response that is received from the user by the authentication server with regard to the particular attempt to authenticate the user being a specified fixed length; and wherein the version indicator having a second value that is different from the first value indicates a second version of the NTLM authentication process based at least in part on the length of the authentication response that is received from the user by the authentication server with regard to the particular attempt to authenticate the user being greater than the specified fixed length.

5. The system of claim 4, wherein the processing unit is configured to:
generate the first security event to have an event ID 4776 associated with the NTLM authentication protocol; and
generate the second security event to have an event ID 8004 associated with the NTLM authentication protocol.

6. The system of claim 4, wherein the processing unit is configured to:
generate the authentication report that indicates a number of attempts to authenticate the user using the authentication protocol in which the first version of the NTLM authentication protocol is used based at least in part on a number of version indicators associated with the attempts to authenticate the user that have the first value.

7. The system of claim 4, wherein the processing unit is configured to:
generate the authentication report that indicates a number of attempts to authenticate the user using the authentication protocol that are described by a third security event.

8. The system of claim 1, wherein the processing unit is configured to:
perform a hash operation on the portion of the common portion in the first aggregated description in the first aggregated event to provide a respective first hash; and
correlate the first aggregated event and the third security event based at least in part on the first hash for the first aggregated event and a hash of a portion of the third description in the third security event being same.

9. The system of claim 1, wherein the processing unit is configured to:
assign a threshold value to the first security event, the second security event, and the third security event;
assign a number that is greater than the threshold value to the first aggregated event;
sum the number that is assigned to the first aggregated event and the threshold value that is assigned to the third security event to provide a summed value that is assigned to the second aggregated event; and
generate the authentication report to not include a description of each event that has a value that is less than or equal to the threshold value.

10. The system of claim 1, wherein the portion of the first description is a first portion and the portion of the second description is a second portion;

wherein the first description includes the first portion and a status indicator;

wherein the first portion includes at least one of the following:
a first user identifier that indicates the user to whom the attempt to authenticate pertains,
a first computer identifier that identifies a computer from which an authentication request corresponding to the attempt to authenticate the user is received,
a first server identifier that identifies an authentication server that generates the first security event,
a first timestamp indicating a time at which the attempt to authenticate the user occurred;

wherein the status indicator indicates whether the attempt to authenticate the user resulted in authentication of the user;

wherein the second description includes the second portion and a resource indicator;

wherein the second portion includes at least one of the following:
a second user identifier that indicates the user to whom the attempt to authenticate pertains,
a second computer identifier that identifies a computer from which an authentication request corresponding to the attempt to authenticate the user is received,
a second server identifier that identifies an authentication server that generates the second security event,
a second timestamp indicating a time at which the attempt to authenticate the user occurred;

wherein the resource indicator indicating a resource that the user attempts to access based at least in part on the attempt to authenticate; and wherein the first aggregated description including the common portion, the status indicator, and the resource indicator.

11. The system of claim 10, wherein the first portion of the first description in the first security event includes at least the first user identifier and the first computer identifier; and
wherein the second portion of the second description in the second security event includes at least the second user identifier and the second computer identifier.

12. The system of claim 10, wherein the first portion of the first description in the first security event includes at least the first server identifier and the first timestamp; and
wherein the second portion of the second description in the second security event includes at least the second server identifier and the second timestamp.

13. A method of using security event correlation to describe an authentication process, the method comprising:
correlating a first security event that includes a first description that describes a particular attempt to authenticate a user, which is initiated by a particular authentication request regarding the user, using an authentication protocol and a second security event that includes a second description that further describes the particular attempt to authenticate the user, which is initiated by the particular authentication request regarding the user, using the authentication protocol to identify a correlated event pair based at least in part on a portion of the first description and a portion of the second description being same to define a common portion;
aggregating the first security event and the second security event to provide a first aggregated event based at least in part on the first security event and the second security event being correlated, the first aggregated event including a first aggregated description that includes an aggregation of the first and second descriptions that are included in the respective first and second security events;
correlating the first aggregated event and a third security event that includes a third description that describes the particular attempt to authenticate the user using the authentication protocol to identify an associated event pair based at least in part on a portion of the common portion in the first aggregated description in the first aggregated event and a portion of the third description in the third security event being same;
aggregating the first aggregated event and the third security event to provide a second aggregated event based at least in part on the first aggregated event and the third security event being correlated, the second aggregated event including a second aggregated description that includes an aggregation of the first aggregated description and the third description that are included in the first aggregated event and the third security event, respectively; and
generating an authentication report that includes the second aggregated description of the second aggregated event to describe the authentication process.

14. The method of claim 13, wherein the first description in the first security event includes a first user identifier that indicates the user to whom the particular attempt to authenticate pertains, a first computer identifier that identifies a computer from which the particular authentication request corresponding to the particular attempt to authenticate the user is received, a first server identifier that identifies an authentication server that generates the first security event, a first timestamp indicating a time at which the particular attempt to authenticate the user occurred, and a status indicator that indicates whether the particular attempt to authenticate the user resulted in authentication of the user;
wherein the second description in the second security event includes a second user identifier that indicates the user to whom the particular attempt to authenticate pertains, a second computer identifier that identifies a computer from which the particular authentication request corresponding to the particular attempt to authenticate the user is received, a second server identifier that identifies an authentication server that generates the second security event, a second timestamp indicating a time at which the particular attempt to authenticate the user occurred, and a resource indicator that indicates a resource that the user attempts to access based at least in part on the particular attempt to authenticate;
wherein correlating the first security event and the second security event comprises:
correlating the first security event and the second security event to identify the correlated event pair based at least in part on the first and second user identifiers therein being same to define a common user identifier, the first and second computer identifiers therein being same to define a common computer identifier, the first and second server identifiers therein being same to define a common server identifier, and the first and second timestamps therein being same to define a common timestamp; and
wherein the first aggregated description in the first aggregated event includes the common user identifier, the common computer identifier, the common server identifier, the common timestamp, the status indicator, and the resource indicator.

15. The method of claim 14, wherein the third description in the third security event includes a third user identifier that indicates the user to whom the particular attempt to authenticate pertains, a third computer identifier that identifies a computer from which the particular authentication request corresponding to the particular attempt to authenticate the user is received, a third server identifier that identifies an authentication server that generates the third security event, and a version indicator that indicates a version of the authentication protocol that is used in the particular attempt to authenticate the user that is based at least in part on a length of an authentication response that is received from the user by the authentication server with regard to the particular attempt to authenticate the user;
wherein correlating the first aggregated event and the third security event comprises:
correlating the first aggregated event and the third security event to identify the associated event pair based at least in part on the common and third user identifiers therein being same, the common and third computer identifiers therein being same, and the common and third server identifiers therein being same; and
wherein the second aggregated description in the second aggregated event includes the common user identifier, the common computer identifier, the common server identifier, the common timestamp, the status indicator, the resource indicator, and the version indicator.

16. The method of claim 15, wherein the authentication process is a new technology LAN manager (NTLM) authentication process;
wherein the version indicator having a first value indicates a first version of the NTLM authentication process based at least in part on the length of the authentication response that is received from the user by the authentication server with regard to the particular attempt to authenticate the user being a specified fixed length; and wherein the version indicator having a second value that is different from the first value indicates a second version of the NTLM authentication process based at least in part on the length of the authentication response that is received from the user by the authentication server with regard to the particular attempt to authenticate the user being greater than the specified fixed length.

17. The method of claim 16, further comprising:

generating the first security event to have an event ID 4776 associated with the NTLM authentication protocol; and generating the second security event to have an event ID 8004 associated with the NTLM authentication protocol.

18. The method of claim 16, wherein generating the authentication report comprises:

generating the authentication report that indicates a number of attempts to authenticate the user using the authentication protocol in which the first version of the NTLM authentication protocol is used based at least in part on a number of version indicators associated with the attempts to authenticate the user that have the first value.

19. The method of claim 13, wherein generating the authentication report comprises:

assigning a threshold value to the first security event, the second security event, and the third security event;

assigning a number that is greater than the threshold value to the first aggregated event;

summing the number that is assigned to the first aggregated event and the threshold value that is assigned to the third security event to provide a summed value that is assigned to the second aggregated event; and generating the authentication report to not include a description of each event that has a value that is less than or equal to the threshold value.

20. A computer program product comprising a computer-readable storage medium having instructions recorded thereon for enabling a processor-based system to perform operations to use security event correlation to describe an authentication process, the operations comprising:

correlate a first security event that includes a first description that describes a particular attempt to authenticate a user, which is initiated by a particular authentication request regarding the user, using an authentication protocol and a second security event that includes a second description that further describes the particular attempt to authenticate the user, which is initiated by the particular authentication request regarding the user, using the authentication protocol to identify a correlated event pair based at least in part on a portion of the first description in the first security event and a portion of the second description in the second security event being same to define a common portion;

aggregate the first security event and the second security event to provide a first aggregated event based at least in part on the first security event and the second security event being correlated, the first aggregated event including a first aggregated description that includes an aggregation of the first and second descriptions that are included in the respective first and second security events;

correlate the first aggregated event and a third security event that includes a third description that describes the particular attempt to authenticate the user using the authentication protocol to identify an associated event pair based at least in part on a portion of the common portion in the first aggregated description in the first aggregated event and a portion of the third description in the third security event being same;

aggregate the first aggregated event and the third security event to provide a second aggregated event based at least in part on the first aggregated event and the third security event being correlated, the second aggregated event including a second aggregated description that includes an aggregation of the first aggregated description and the third description that are included in the first aggregated event and the third security event, respectively; and generate an authentication report that includes the second aggregated description of the second aggregated event to describe the authentication process.

* * * * *